US010599958B2

(12) United States Patent
He et al.

(10) Patent No.: US 10,599,958 B2
(45) Date of Patent: Mar. 24, 2020

(54) METHOD AND SYSTEM FOR CLASSIFYING AN OBJECT-OF-INTEREST USING AN ARTIFICIAL NEURAL NETWORK

(71) Applicant: Avigilon Corporation, Vancouver (CA)

(72) Inventors: Lu He, Somerville, MA (US); Yin Wang, Malden, MA (US); Aleksey Lipchin, Newton, MA (US)

(73) Assignee: Avigilon Corporation, Vancouver (CA)

( * ) Notice: Subject to any disclaimer, the term of this patent is extended or adjusted under 35 U.S.C. 154(b) by 249 days.

(21) Appl. No.: 15/842,605

(22) Filed: Dec. 14, 2017

(65) Prior Publication Data

US 2019/0188524 A1 Jun. 20, 2019

(51) Int. Cl.
*G06K 9/62* (2006.01)
*G06K 9/00* (2006.01)

(52) U.S. Cl.
CPC ......... *G06K 9/627* (2013.01); *G06K 9/00718* (2013.01); *G06K 9/00771* (2013.01); *G06K 9/6255* (2013.01); *G06K 9/6256* (2013.01)

(58) Field of Classification Search
CPC .... G06F 3/011; G06F 3/0304; G06F 16/2264; G06F 16/9024; G06F 3/0346; A63F 13/213; A63F 13/24; A63F 13/426; A63F 13/428; A63F 13/655; A63F 13/00; G06T 7/73; G06K 9/00771; G06K 9/6202; G06K 9/00221; G06K 9/00335; G06K 9/00369;
(Continued)

(56) References Cited

U.S. PATENT DOCUMENTS

2008/0051957 A1 2/2008 Breed et al.
2017/0061625 A1 3/2017 Estranda et al.
2017/0270674 A1 9/2017 Shrivastava

FOREIGN PATENT DOCUMENTS

EP 3203412 A1 8/2017

OTHER PUBLICATIONS

Eisenbach et al. ("Cooperative Multi-Scale Convolutional Neural Networks for Person Detection", Published in: 2016 International Joint Conference on Neural Networks (IJCNN), Date Jul. 24-29, 2016, pp. 267-276).*

(Continued)

*Primary Examiner* — Duy M Dang
(74) *Attorney, Agent, or Firm* — Daniel Hammond

(57) ABSTRACT

Methods, systems, and techniques for classifying an object-of-interest using an artificial neural network, such as a convolutional neural network. An artificial neural network receives a sample image including the object-of-interest overlaying a background and a sample background image excluding the object-of-interest and corresponding to the background overlaid by the object-of-interest. The object-of-interest is classified using the artificial neural network. The artificial neural network classifies the object-of-interest using the sample background and sample images. Prior to receiving the sample background and sample images the artificial neural network has been trained to classify the object-of-interest using training image pairs. Each of at least some of the training image pairs includes a first training image that includes a training object-of-interest overlaying a training background and a training background image excluding the training object-of-interest and corresponding to the training background.

37 Claims, 14 Drawing Sheets

(58) Field of Classification Search
CPC .. G06K 9/627; G06K 9/00718; G06K 9/6256; G06K 9/62; G06N 3/04; G06N 3/08; G06N 3/02; H04N 7/181; H04N 5/2226; G08C 17/00; G08C 17/02; G08B 13/196
See application file for complete search history.

(56) References Cited

OTHER PUBLICATIONS

Stauffer, C. and Grimson, W.E.L., "Adaptive Background Mixture Models for Real-Time Tracking", IEEE Computer Society Conference on Computer Vision and Pattern Recognition, vol. 2 (Aug. 6, 1999), pp. 2246-2252.

Liu, W. et al., "SSD: Single Shot MultiBox Detector", in: Leibe, B. et al., (Eds.), European Conference on Computer Vision, 2016, Part I, Lecture Notes in Computer Science 9905, pp. 21-37.

Redmon, J. et al., "You Only Look Once: Unified, Real-Time Object Detection", Proceedings of the IEEE Conference on Computer Vision and Pattern Recognition, 2016, pp. 779-788.

Krizhevsky, A. et al., "ImageNet Classification with Deep Convolutional Neural Networks", Advances in Neural Information Processing Systems 25, Dec. 3-8, 2012, pp. 1097-1105.

LeCun, Y. et al., "Gradient-Based Learning Applied to Document Recognition", Proceedings of the IEEE, vol. 86, No. 11 (Nov. 1998), pp. 2278-2324.

Babaee, M. et al., "A Deep Convolutional Neural Network for Background Subtraction", Cornell University Library, Feb. 6, 2017, retrieved from the Internet <URL: https://arxiv.org/abs/1702.01731>.

Zhao et al., "Joint Background Reconstruction and Foreground Segmentation via a Two-Stage Convolutional Neural Network", Cornell University Library, Jul. 24, 2017, retrieved from the Internet <URL: https://arxiv.org/pdf/1707.07584.pdf>.

Ravishankar H. et al., "Joint Deep Learning of Foreground, Background and Shape for Robust Contextual Segmentation", Jan. 2, 2017, retrieved from the Internet <URL: https://www.researchgate.net/publication/311715357_Joint_Deep_Learning_of_Foreground_Background_and_Shape_for_Robust_Contextual_Segmentation>.

Oh, Sangmin et al., "A Large-Scale Benchmark Dataset for Event Recognition in Surveillance Video", Proceedings of the IEEE Conference on Computer Vision and Pattern Recognition, Jun. 20-23, 2011, pp. 3153-3160.

International Search Report for related International Application No. PCT/CA2018/051569 dated Mar. 15, 2019.

\* cited by examiner

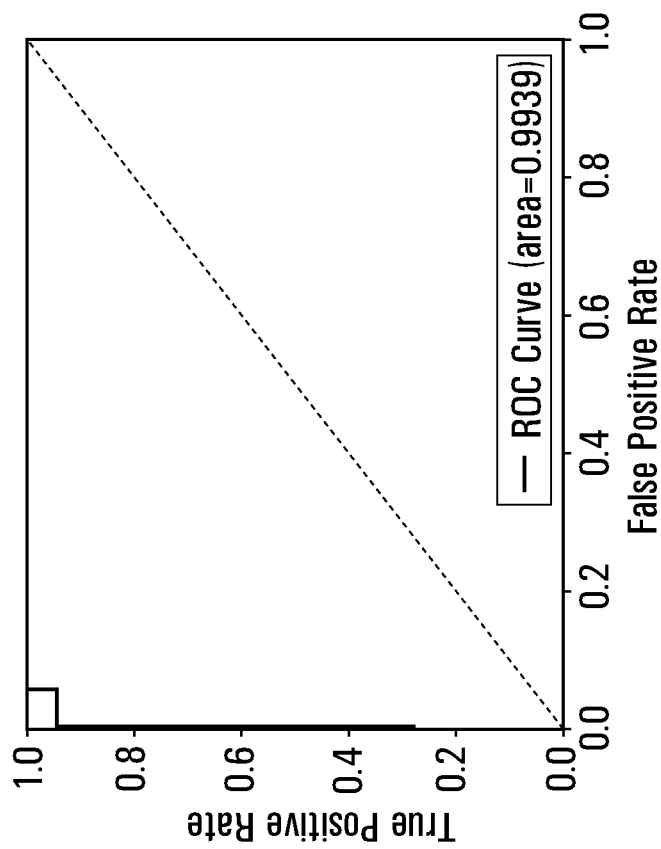
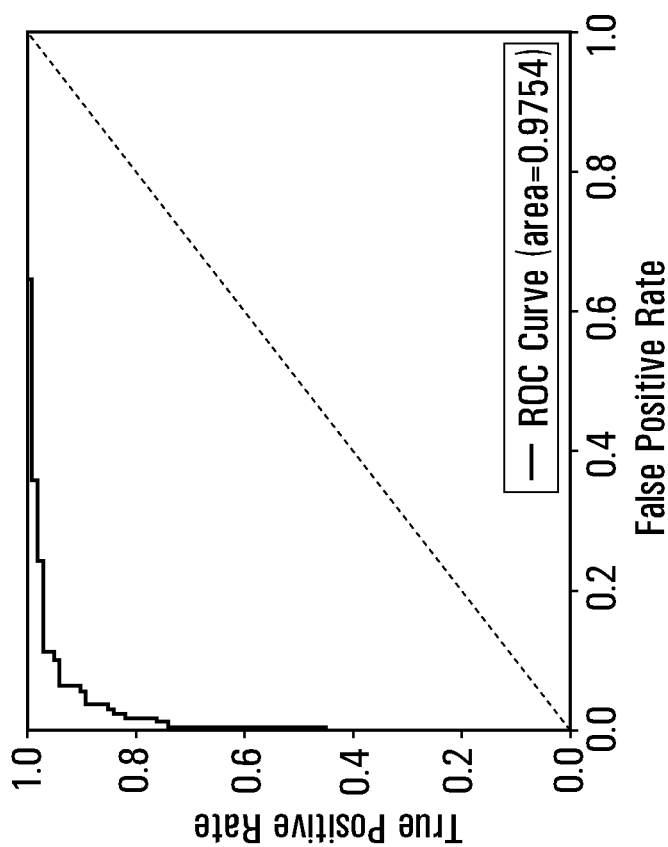
FIG. 9A
FIG. 9B

METHOD AND SYSTEM FOR CLASSIFYING AN OBJECT-OF-INTEREST USING AN ARTIFICIAL NEURAL NETWORK

TECHNICAL FIELD

The present disclosure relates to methods, systems, and techniques for classifying an object-of-interest using an artificial neural network.

BACKGROUND

Computer-implemented visual object classification, also called object recognition, pertains to classifying visual representations of real-life objects found in still images or motion videos captured by a camera. By performing visual object classification, each visual object found in the still images or motion video is classified according to its type (such as, for example, human, vehicle, and animal).

Surveillance systems typically employ video cameras or other image capturing devices or sensors to collect image data such as videos. In the simplest systems, images represented by the image data are displayed for contemporaneous screening by security personnel and/or recorded for later review after a security breach. In those systems, the task of detecting and classifying visual objects of interest is performed by a human observer. A significant advance occurs when the system itself is able to perform object detection and classification, either partly or completely.

In a typical surveillance system, one may be interested in, for example, detecting objects such as humans, vehicles, and animals that move through the environment. More generally, it is beneficial for a surveillance system to be able to, without relying on assistance from a human operator, identify and classify, in a computationally efficiently manner, different objects that are recorded by the cameras that comprise part of the system.

SUMMARY

According to a first aspect, there is provided a method comprising, receiving at an artificial neural network: a sample image comprising the object-of-interest overlaying a background; and a sample background image excluding the object-of-interest and corresponding to the background overlaid by the object-of-interest. The method also comprises classifying the object-of-interest using the artificial neural network, wherein the artificial neural network classifies the object-of-interest using the sample background and sample images. Prior to receiving the sample background and sample images the artificial neural network has been trained to classify the object-of-interest using training image pairs. Each of at least some of the training image pairs comprises a first training image comprising a training object-of-interest overlaying a training background and a training background image excluding the training object-of-interest and corresponding to the training background.

The sample background and sample images may be received having an identical number and type of channels as each other.

The sample background and sample images may collectively comprise a number of channels, and the artificial neural network may comprise a convolutional neural network that comprises multiple layers connected in series that sequentially process the channels.

The layers may comprise at least one convolutional layer that receives the sample background and sample images and at least one pooling layer that receives an output of the at least one convolutional layer.

The convolutional neural network may further comprises a multilayer perceptron network that receives an output of the at least one pooling layer and that outputs a classification of the object-of-interest of the sample image.

The method may further comprise receiving a video comprising multiple frames, wherein each of the frames comprises background pixels; identifying at least some of the background pixels; generating a background model by averaging the background pixels that are identified from the multiple frames; and using as the sample background image at least a portion of the background model.

Identifying at least some of the background pixels may comprise, for each of at least some unclassified pixels in the frames, comparing a magnitude of a motion vector for the unclassified pixel to a background threshold; and when the magnitude of the motion vector is less than a background threshold, classifying the unclassified pixel as a background pixel.

The training object-of-interest may be an identical type of object as the object-of-interest of the sample image, each of at least some others of the training image pairs may comprise a first training image comprising a training object overlaying a training background and a training background image excluding the training object and corresponding to the training background, and the training object-of-interest and training object may be different types of objects.

Each of at least some others of the training image pairs may comprise a first training background image depicting a training background without any object and a second training background image depicting the training background of the first training background image without any object and illuminated differently than in the first training background image.

The training background may differ from the background that the object-of-interest of the sample image overlays.

The artificial neural network may be implemented on a camera comprising part of a video surveillance system.

The sample background and sample images may be image chips derived from images captured by the camera.

The training background image and the sample background image may depict identical locations.

According to another aspect, there is provided a video capture device, comprising an image sensor; a processor communicatively coupled to the image sensor; and a memory device communicatively coupled to the processor, wherein the memory device has stored thereon computer program code that is executable by the processor and that, when executed by the processor, causes the processor to perform a method. The method may comprise receiving at an artificial neural network a sample image comprising the object-of-interest overlaying a background; and a sample background image excluding the object-of-interest and corresponding to the background overlaid by the object-of-interest. The method may further comprise classifying the object-of-interest using the artificial neural network, wherein the artificial neural network classifies the object-of-interest using the sample background and sample images. Prior to receiving the sample background and sample images the artificial neural network has been trained to classify the object-of-interest using training image pairs. Each of at least some of the training image pairs comprises a first training image comprising a training object-of-interest overlaying a training background and a training background image excluding the training object-of-interest and corresponding to the training background.

The sample background and sample images may be received having an identical number and type of channels as each other.

The sample background and sample images may collectively comprise a number of channels, and the artificial neural network may comprise a convolutional neural network that comprises multiple layers connected in series that sequentially process the channels.

The layers may comprise at least one convolutional layer that receives the sample background and sample images and at least one pooling layer that receives an output of the at least one convolutional layer.

The convolutional neural network may further comprise a multilayer perceptron network that receives an output of the at least one pooling layer and that outputs a classification of the object-of-interest of the sample image.

The method may further comprise receiving a video comprising multiple frames, wherein each of the frames comprises background pixels; identifying at least some of the background pixels; generating a background model by averaging the background pixels that are identified from the multiple frames; and using as the sample background image at least a portion of the background model.

Identifying at least some of the background pixels comprises, for each of at least some unclassified pixels in the frames, comparing a magnitude of a motion vector for the unclassified pixel to a background threshold; and when the magnitude of the motion vector is less than a background threshold, classifying the unclassified pixel as a background pixel.

The training object-of-interest may be an identical type of object as the object-of-interest of the sample image, each of at least some others of the training image pairs may comprise a first training image comprising a training object overlaying a training background and a training background image excluding the training object and corresponding to the training background, and the training object-of-interest and training object may be different types of objects.

Each of at least some others of the training image pairs may comprise a first training background image depicting a training background without any object and a second training background image depicting the training background of the first training background image without any object and illuminated differently than in the first training background image.

The training background may differ from the background that the object-of-interest of the sample image overlays.

The sample background and sample images may be image chips derived from images captured by the image sensor.

The training background image and the sample background image may depict identical locations.

According to another aspect, there is a method comprising providing training image pairs to an artificial neural network, wherein at least some of each of the training image pairs comprise a first training image comprising a training object-of-interest overlaying a training background; and a training background image excluding the training object-of-interest and corresponding to the training background. The method may further comprise training, by using the pairs of training images, the artificial neural network to classify an object-of-interest overlaying a background in a sample image using the sample image and a sample background image excluding the object-of-interest of the sample image and corresponding to the background of the sample image.

The training object-of-interest may be an identical type of object as the object-of-interest of the sample image, each of at least some others of the training image pairs may comprise a first training image comprising a training object overlaying a training background and a training background image excluding the training object and corresponding to the training background, and the training object-of-interest and training object may be different types of objects.

Each of at least some others of the training image pairs may comprise a first training background image depicting a training background without any object and a second training background image depicting the training background of the first training background image without any object and illuminated differently than in the first training background image.

The training background may differ from the background that the object-of-interest of the sample image overlays.

The artificial neural network may be implemented on a camera comprising part of a video surveillance system, and the training background image and the sample background image may depict identical locations.

According to another aspect, there is provided a system comprising a storage device that stores pairs of training images; a processor communicatively coupled to the storage device and to an artificial neural network; and a memory device communicatively coupled to the processor, wherein the memory device has stored thereon computer program code that is executable by the processor and that, when executed by the processor, causes the processor to perform a method comprising providing training image pairs to an artificial neural network, wherein at least some of each of the training image pairs comprise a first training image comprising a training object-of-interest overlaying a training background; and a training background image excluding the training object-of-interest and corresponding to the training background. The method may further comprise training, by using the pairs of training images, the artificial neural network to classify an object-of-interest overlaying a background in a sample image using the sample image and a sample background image excluding the object-of-interest of the sample image and corresponding to the background of the sample image.

The training object-of-interest may be an identical type of object as the object-of-interest of the sample image, each of at least some others of the training image pairs may comprise a first training image comprising a training object overlaying a training background and a training background image excluding the training object and corresponding to the training background, and the training object-of-interest and training object may be different types of objects.

Each of at least some others of the training image pairs may comprise a first training background image depicting a training background without any object and a second training background image depicting the training background of the first training background image without any object and illuminated differently than in the first training background image.

The training background may differ from the background that the object-of-interest of the sample image overlays.

The artificial neural network may be implemented on a camera comprising part of a video surveillance system, and the training background image and the sample background image may depict identical locations.

According to another aspect, there is provided a non-transitory computer readable medium having stored thereon computer program code that is executable by a processor and that, when executed by the processor, causes the processor to perform a method according to any of the foregoing aspects and suitable combinations thereof.

This summary does not necessarily describe the entire scope of all aspects. Other aspects, features and advantages will be apparent to those of ordinary skill in the art upon review of the following description of example embodiments.

BRIEF DESCRIPTION OF THE DRAWINGS

In the accompanying drawings, which illustrate one or more example embodiments:

FIGS. 8A-8D and 9A-9B depict graphs of the receiver operating characteristic for convolutional neural networks trained according to conventional methods;

DETAILED DESCRIPTION

Figure 1:
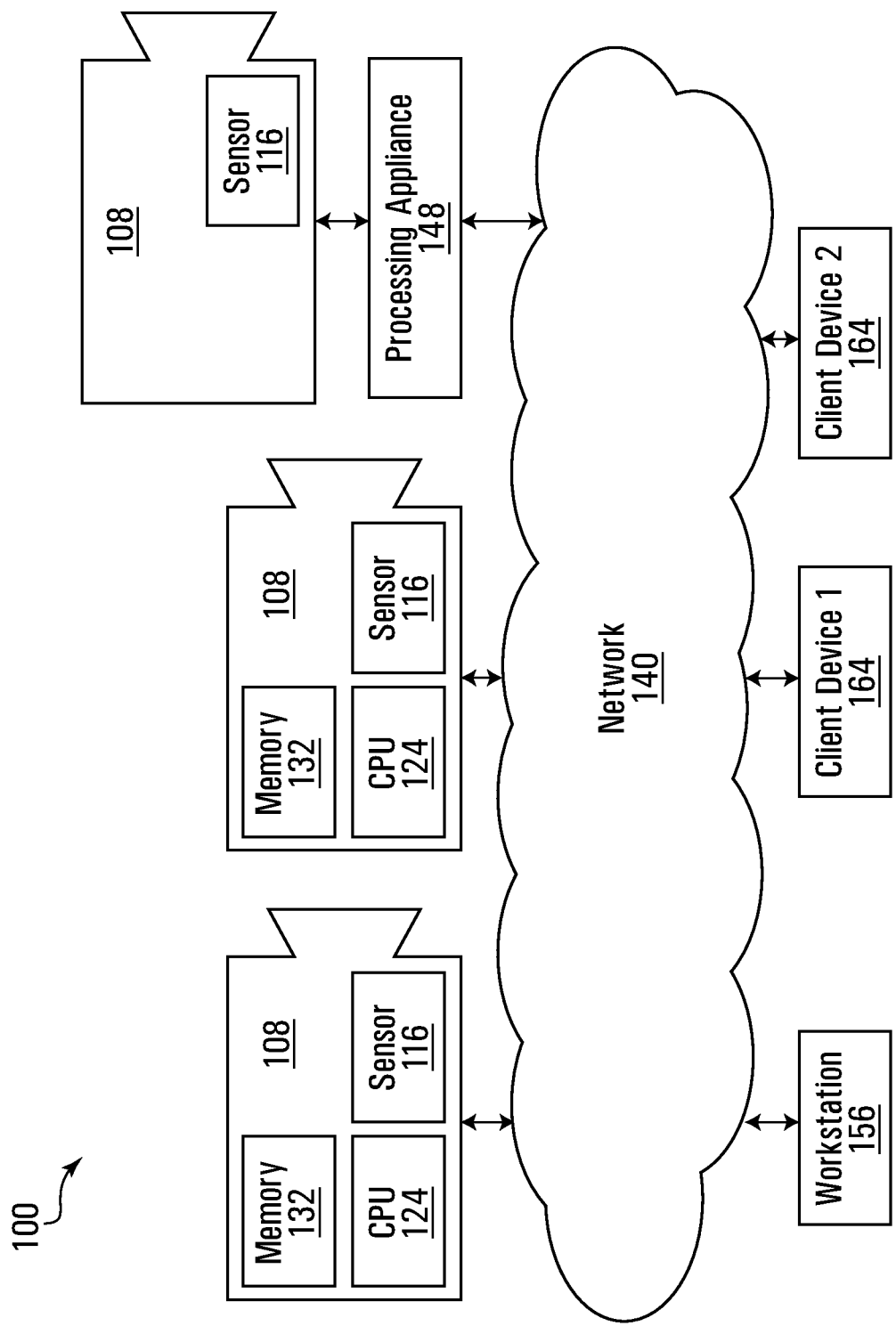
FIG. 1 illustrates a block diagram of connected devices of a video capture and playback system according to an example embodiment.

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

A plurality of sequential image frames may together form a video captured by the video capture device. Each image frame may be represented by a matrix of pixels, each pixel having a pixel image value. For example, the pixel image value may be a single numerical value for grayscale (such as, for example, 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analyses of images including images in video. For example, processing video may include, but is not limited to, image processing operations, analyzing, managing, compressing, encoding, storing, transmitting, and/or playing back the video data. Analyzing the video may include segmenting areas of image frames and detecting visual objects, and tracking and/or classifying visual objects located within the captured scene represented by the image data. The processing of the image data may also cause additional information regarding the image data or visual objects captured within the images to be output. That additional information is commonly referred to as "metadata". The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 or camera 108 is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD. In at least one different example embodiment (not depicted), the video capture device 108 may comprise an analog camera connected to an encoder, with the encoder digitizing analog video captured by the analog camera for subsequent processing.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared range and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU), embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program code. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Read-Only Memory (EPROM), Electrically Erasable Programmable Read-Only Memory (EE-PROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the video capture device 108 may be implemented together within a system on a chip (SOC). For example, the processor 124, the memory device 116 and the network interface may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, WAN, Internet) or a combination thereof. In other examples, the network 140 may include a cloud network.

In some examples, the video capture and playback system 100 includes a processing appliance 148. The processing appliance 148 is operable to process the image data outputted by a video capture device 108. The processing appliance 148 also includes one or more processors and one or more memory devices coupled to the one or more processors (CPU). The processing appliance 148 may also include one or more network interfaces. For convenience of illustration only one processing appliance 148 is shown; however it will be understood that the video capture and playback system 100 may include any suitable number of processing appliances 148.

For example, and as illustrated, the video capture and playback system 100 includes at least one workstation 156 (such as, for example, a server), each having one or more processors including graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, mouse, keyboard, touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the image capture and playback system 100 may be implemented without the workstation 156. Accordingly, image processing functionalities may be performed on a system entity other than the workstation 156 such as, for example, the image processing functionalities may be wholly performed on the one or more video capture devices 108. Alternatively, the image processing functionalities may be, for example, shared amongst two or more of the video capture devices 108, processing appliance 148 and client devices 164.

Figure 2:
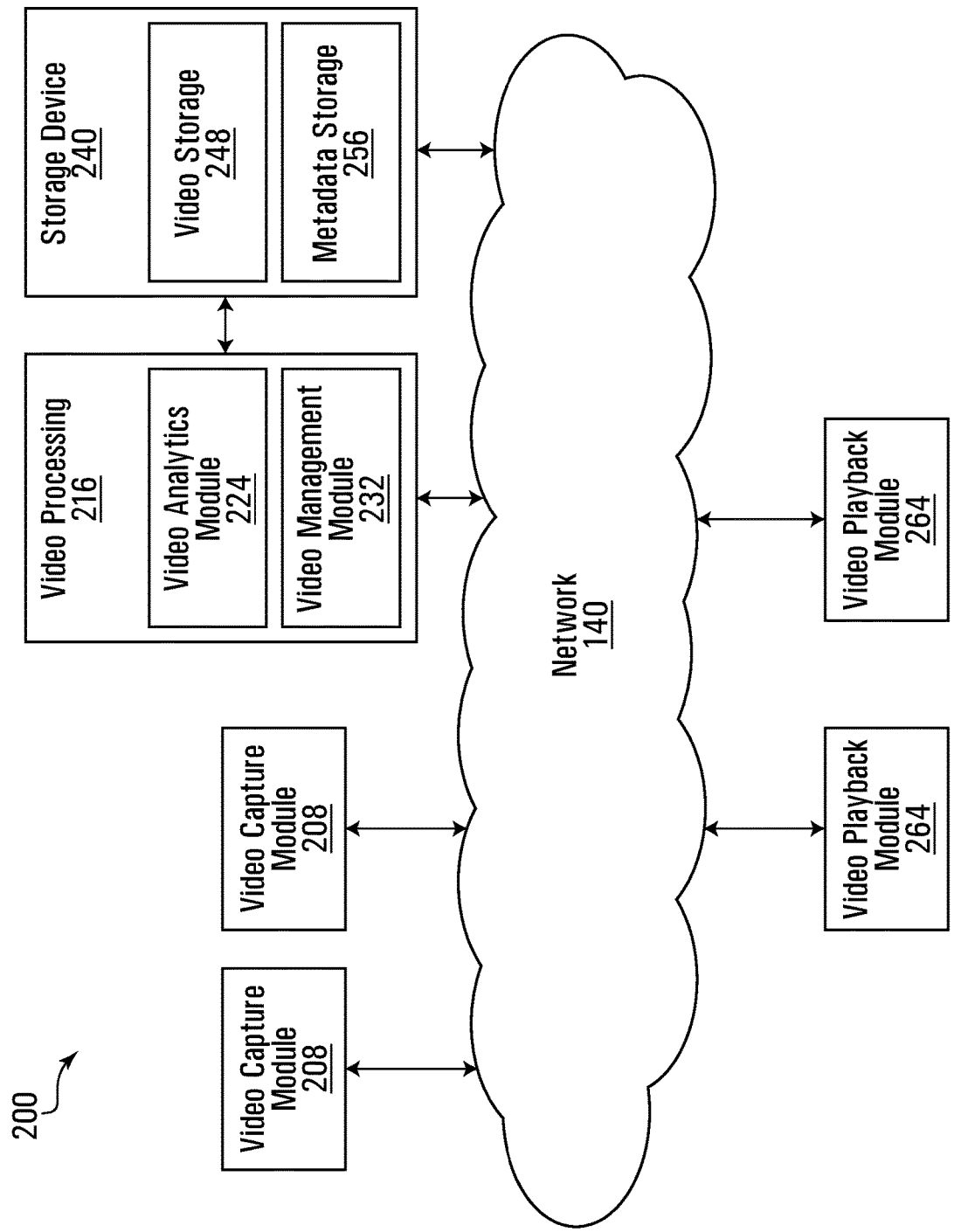
FIG. 2 illustrates a block diagram of a set of operational modules of the video capture and playback system according to the example embodiment of FIG. 1.

Referring now to FIG. 2, there is illustrated a block diagram of a set 200 of operational modules of the video capture and playback system 100 according to one example embodiment. The operational modules may be implemented in hardware, software, or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, sensor 116, etc.) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identification of objects "left behind" or "removed", and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 (FIG. 1) that will be playing back the video, such as processing power and/or resolution of the display of the client device 164. The video management 232 may also process the image data according to storage capacity within the video capture and playback system 100 for storing image data.

It will be understood that the subset 216 of video processing modules may, in accordance with some example embodiments, include only one of the video analytics module 224 and the video management module 232. Also, in accordance with other alternative example embodiments, the subset 16 of video processing modules may include more video processing modules than the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data outputted from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data and playback the image data as a video. For example, the video playback module 264 may be implemented on a client device 164.

The operational modules of the set 200 may be implemented on one or more of the video capture device 108, processing appliance 148, workstation 156, and client device 164 shown in FIG. 1. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an video capture device 108, processing appliance 148 and workstation 156. Similarly, video management functionalities may be split between one or more of an video capture device 108, processing appliance 148, and workstation 156.

Figure 3:
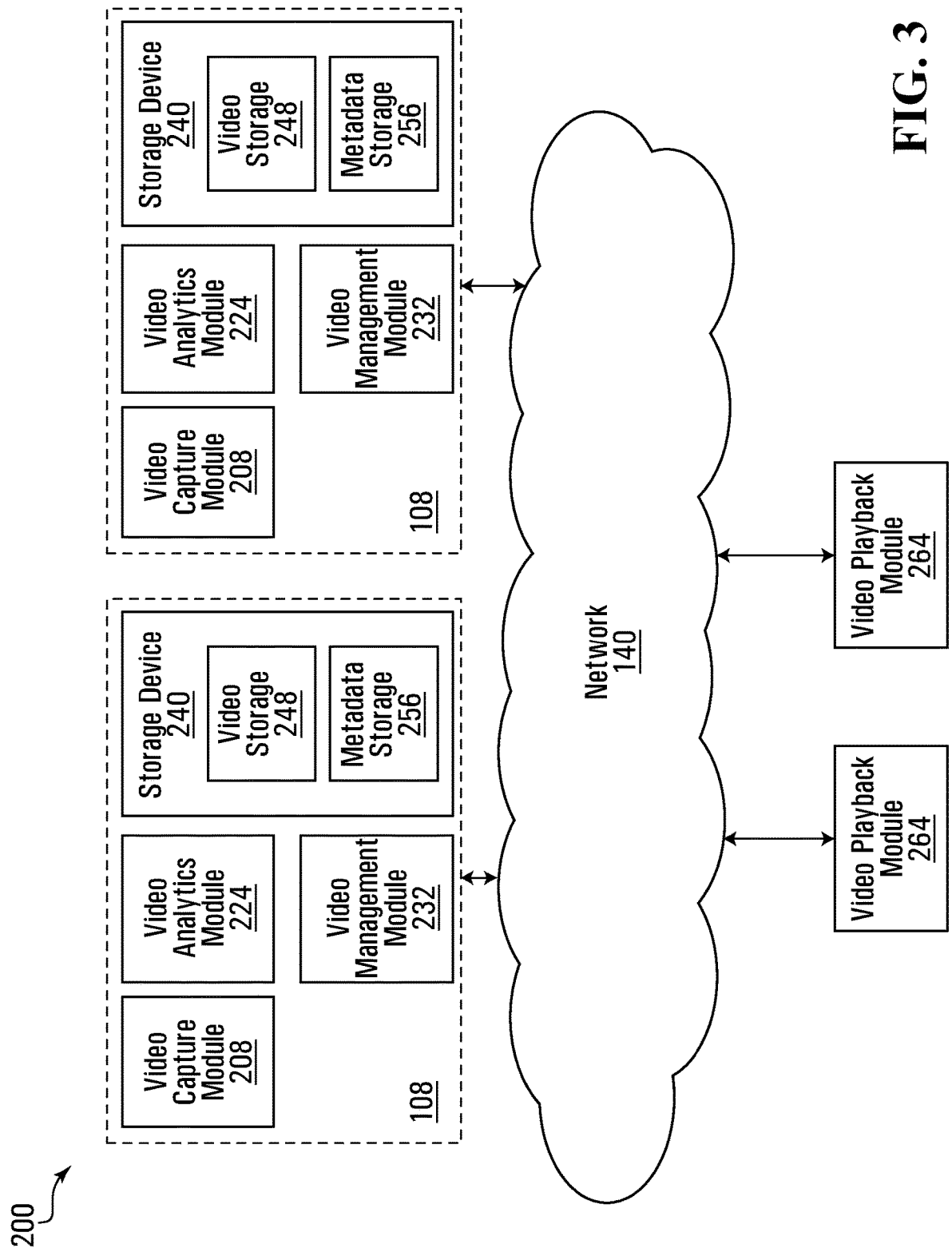
FIG. 3 illustrates a block diagram of a set of operational modules of the video capture and playback system according to the example embodiment of FIG. 1 in which a video analytics module, a video management module, and a storage device are wholly implemented on one or more image capture devices included in the video capture and playback system.

Referring now to FIG. 3, therein illustrated is a block diagram of a set 200 of operational modules of the video capture and playback system 100 according to one particular example embodiment wherein the video analytics module 224, the video management module 232 and the storage device 240 is wholly implemented on the one or more image capture devices 108. Alternatively, the video analytics module 224, the video management module 232 and the storage device 240 is wholly implemented on the processing appliance 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (e.g. manufacturers) or retrofitting an existing video capture and playback system.

In certain embodiments herein, the video analytics module 224 employs an artificial neural network to process the image data and to classify objects-of-interest therein. One example type of artificial neural network that the video analytics module 224 may use is a convolutional neural network (CNN), which may run on a GPU. Conventionally, a CNN used for object classification requires a very large data corpus for training and, at run-time, significant computational resources in the form of processing power and memory. These computational limitations can make it difficult to use a CNN on certain embedded systems such as, for example, the video capture device 108.

A number of the embodiments herein address the above-mentioned problem by using not only one or more images of the object-of-interest overlaid on a background as input to the CNN, but one or more images of the object-of-interest overlaid on the background (each a "sample image") and one or more images excluding the object-of-interest and corresponding to the background overlaid by the object-of-interest (each a "sample background image"). As discussed in more detail below, the background depicted in the sample background image may exactly match the background of the sample image; alternatively, the background depicted in the sample background image may comprise at least a portion of a background model that is generated to approximate the background of the sample image (e.g., by averaging multiple video frames showing the same location depicted as the background of the sample image). In both cases, the sample background image is said to correspond to the background of the sample image.

The CNN is trained prior to deployment with pairs of training images, with a first training image of each pair comprising a training object-of-interest overlaid on a training background and a training background image of each pair excluding the training object-of-interest and corresponding to the training background. The training images may be stored using any suitable storage device in any suitable format (e.g., in a database). In certain embodiments, the CNN may be alternatively or additionally trained after the video capture device 108 has been deployed, thereby being trained using at least a portion of the background that the CNN encounters during deployment and increasing accuracy; this is referred to as using a "scene customized" background. By using a pair of images, one of which comprises the object-of-interest overlaid on the background and one of which excludes the object-of-interest and corresponds to the background overlaid by the object-of-interest, the CNN may be used for object classification with at least one of higher object classification accuracy and lower computational requirements than conventional CNNs.

Figure 4:
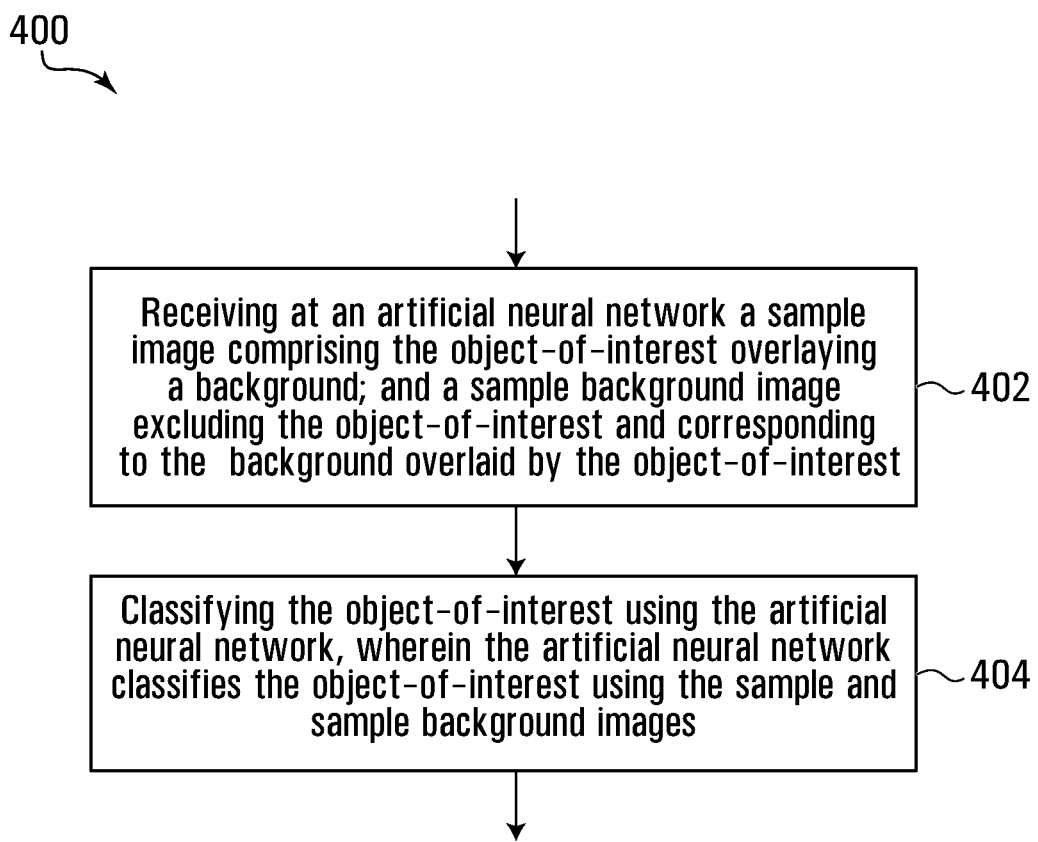
FIG. 4 illustrates a flow chart depicting an example method for classifying an object-of-interest using an artificial neural network.
Figure 5:
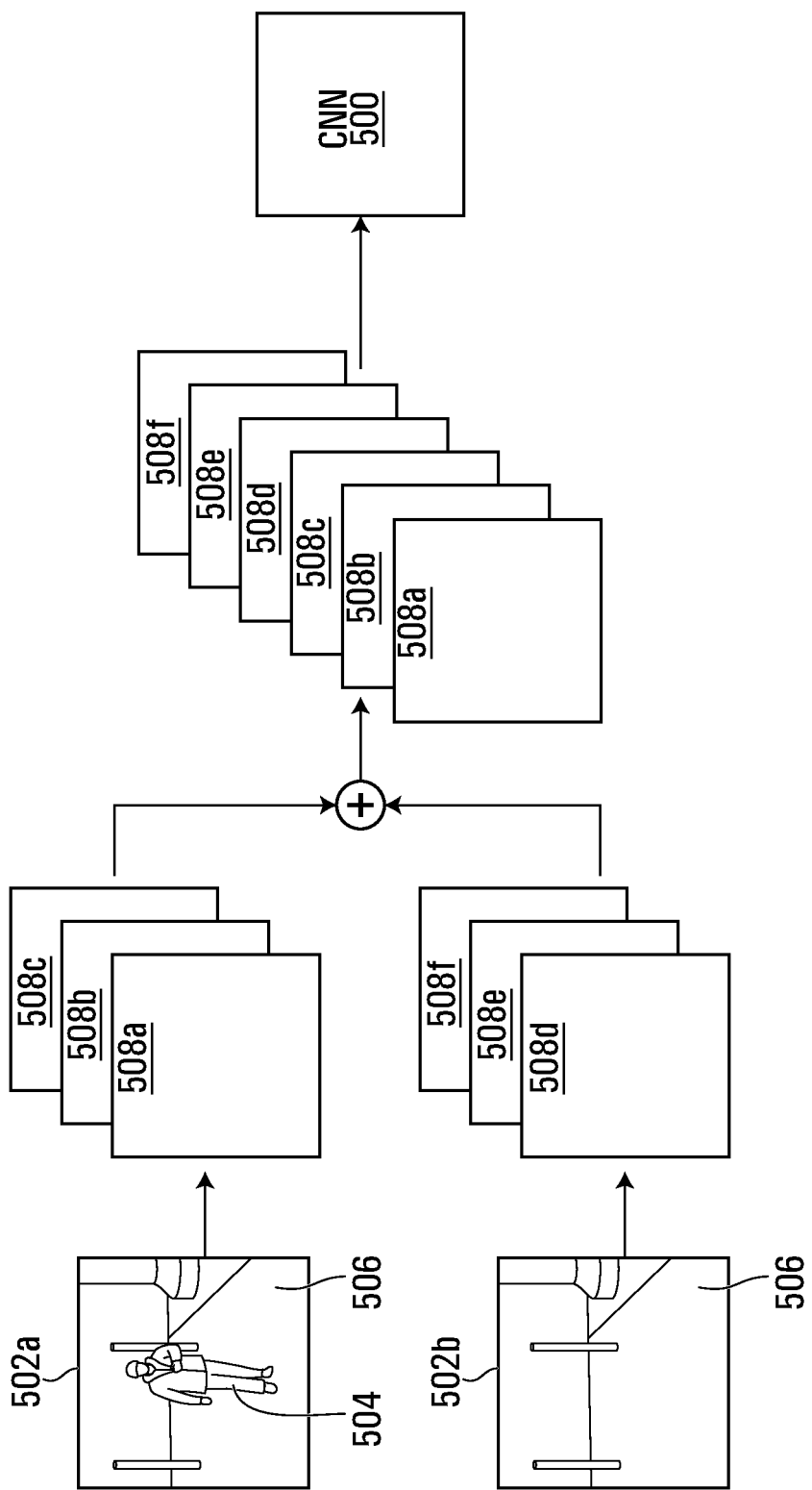
FIG. 5 depicts sample background and sample images being input to a convolutional neural network for classification of an object-of-interest depicted in the sample image, in accordance with the method of FIG. 4.

Reference will now be made to FIGS. 4 and 5. FIG. 4 depicts a flowchart describing an example method 400 for classifying an object-of-interest 504 (depicted in FIG. 5) using an artificial neural network, which in the method 400 of FIG. 4 comprises a CNN 500 (depicted in FIG. 5). The method 400 may be expressed as computer program code comprising part of the video analytics module 224 of the video capture device 108. At block 402, and as depicted in FIG. 5, the CNN 500 receives a sample image 502a comprising the object-of-interest 504 overlaying a background 506, and a sample background image 502b comprising the background 506 excluding the object-of-interest 504 and corresponding to the background 506 overlaid by the object-of-interest 504. In this example embodiment, the sample background and sample images 502a,b have an identical number and type of channels 508a-f (generally, "channels 508") as each other in that each of the images 502a,b is expressed as a 3-channel RGB image, with the sample image 502a comprising a red channel 508a, a green channel 508b, and a blue channel 508c, and the sample background image 502b similarly comprising a red channel 508d, a green channel 508e, and a blue channel 508f. In different embodiments (not depicted), one or both of the images 502a,b may be expressed differently than as a 3-channel RGB image. For example, one or both of the object-of-interest 504 and the background 506 may comprise one or more channels 508 representing greyscale images; and RGB and depth (RGBD) images; and any combination thereof. Furthermore, while in the depicted example embodiment the object-of-interest 504 and the background 506 are represented identically using the same number and type of channels 508, in at least some different example embodiments (not depicted) the object-of-interest 504 and the background 506 are represented differently. For example, the object-of-interest 504 may be represented using one greyscale channel 508, and the background 506 may be represented in RGB using three channels 508.

In at least the depicted example embodiment, all of the channels 508a-f are concurrently present as input to be received by the CNN 500 prior to the CNN's 500 commencing image processing. For example, the channels 508a-f may be concurrently stored on the memory device 132 of the video capture device 108, and accordingly be ready for concurrent retrieval by the video analytics module 224. For example and as discussed in further detail below, the background 506 may comprise part of a background model 704 that the module 224 maintains in memory, and thereby always be available for access by the CNN 500. In at least the depicted example embodiment, from when the CNN 500 receives a first of the channels 508a-f of the sample background and sample images 502a,b until when the CNN 500 receives a last of the channels 508a-f of the sample background and sample images 502a,b, the CNN 500 receives channels from no other images. For example, the CNN 500 may concurrently receive all of the channels 508a-f as described above. Additionally, in at least some different embodiments (not depicted), the channels 508a-f may be in an order other than the red, green, and blue channels 508a-c of the sample image 502a followed by the red, green, and blue channels 508d-f of the sample background image 502b as depicted in FIG. 5.

Figure 7A:
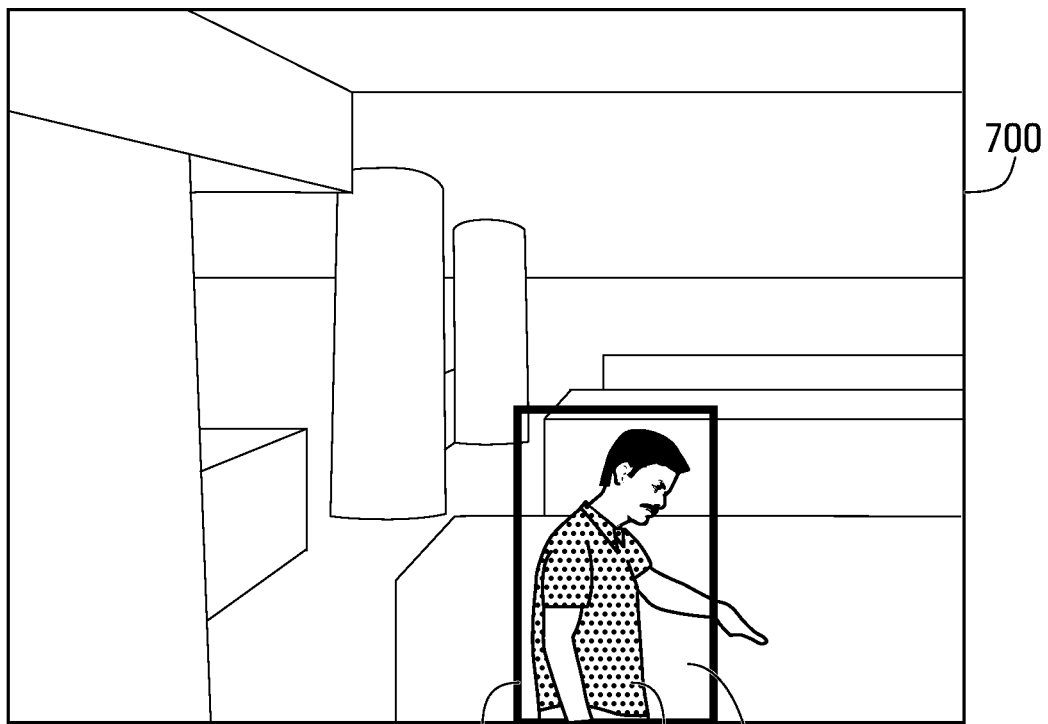
FIGS. 7A and 7B depict an example frame of video captured using the video capture and playback system of FIG. 1 and the associated background model, respectively.
Figure 7B:
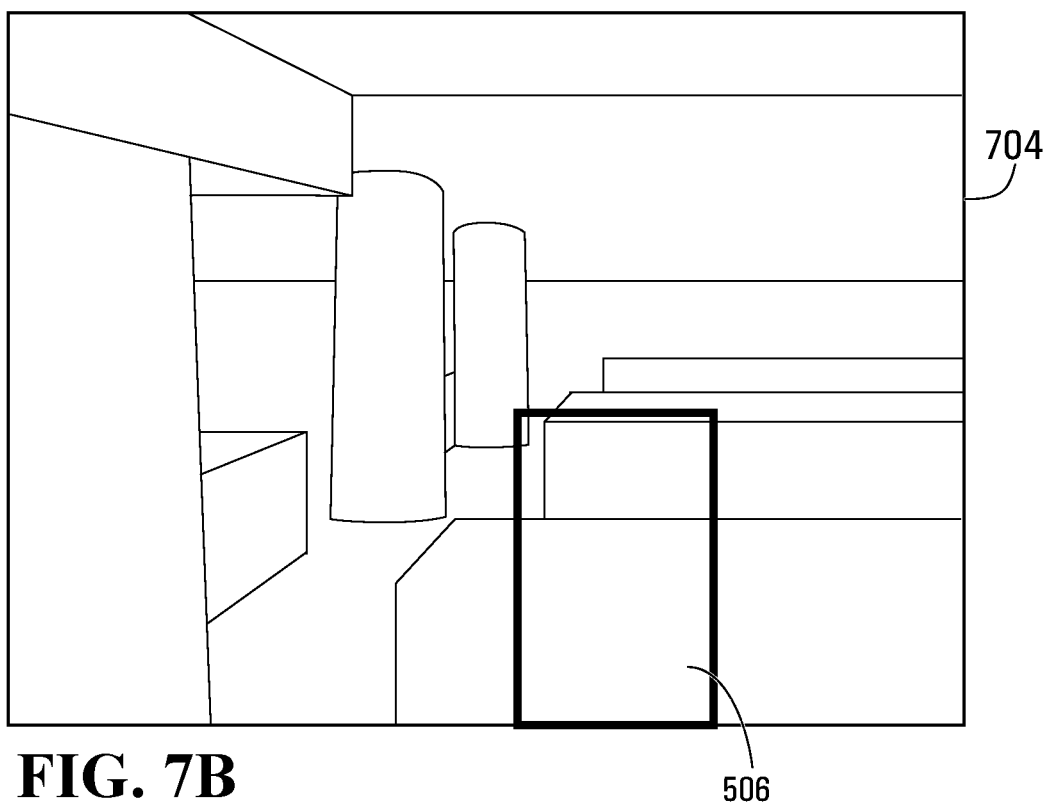

The video analytics module 224 generates and maintains a background model 704 (depicted in FIGS. 7B and 12) of the background 506, and in at least the depicted example embodiment uses the background model 704 as the sample background image 502b. The video analytics module 224 receives a video that collectively comprises the background 506, which may be spread over multiple frames 700 (depicted in FIG. 7A) of the video and partially occluded in different locations in different frames. The module 224 generates and maintains the background model 704 from image data contained in those frames 700. In at least some example embodiments, the module 224 identifies pixels from any given group of frames 700 that comprise part of the background 506 and averages those background pixels to maintain the background model 704. In at least one example embodiment, the module 224 does this using the motion vectors for the pixels. If the motion vector for an unclassified pixel (i.e., a pixel that has not been classified as a background or foreground pixel) is below a background threshold, and ideally zero, the module 224 classifies that unclassified pixel as a background pixel and averages background pixels from different frames to maintain the background model 704. The background model 704 may, for example, accordingly comprise an average, such as an exponential moving average, of background pixels the module 224 has identified from an averaging interval of the last N frames, where N is any suitable integer.

More generally, in at least some example embodiments the module 224 may determine which pixels of a frame 700 comprise background pixels using any suitable method in which the false positive rate (i.e., the rate at which foreground pixels are misclassified as being in the background) and the false negative rate (i.e., the rate at which background pixels are misclassified as being in the foreground) are sufficiently small. In some example embodiments, so long as the false negative rate is low enough that during an averaging interval of N frames a background pixel representing a particular location in the background is correctly classified as a background pixel in at least one of those N frames, the module 224 is able to represent that location in the background model 704. As the module 224 generates the background model 704 by averaging pixels over time, generating the background model 704 in this manner uses only those pixels that have a relatively high probability of being background pixels, and thus in some example embodiments saves computational resources at the cost of taking a longer time to generate the model 704.

In at least some different example embodiments (not depicted), the sample background image 502b may be generated in a different manner. For example, the sample background image 502b may be a single still image, selected by an operator of the video capture device 108. The selected still image may correspond to the background 506 captured by the video capture device 108 once the device 108 has been installed.

Figure 6:
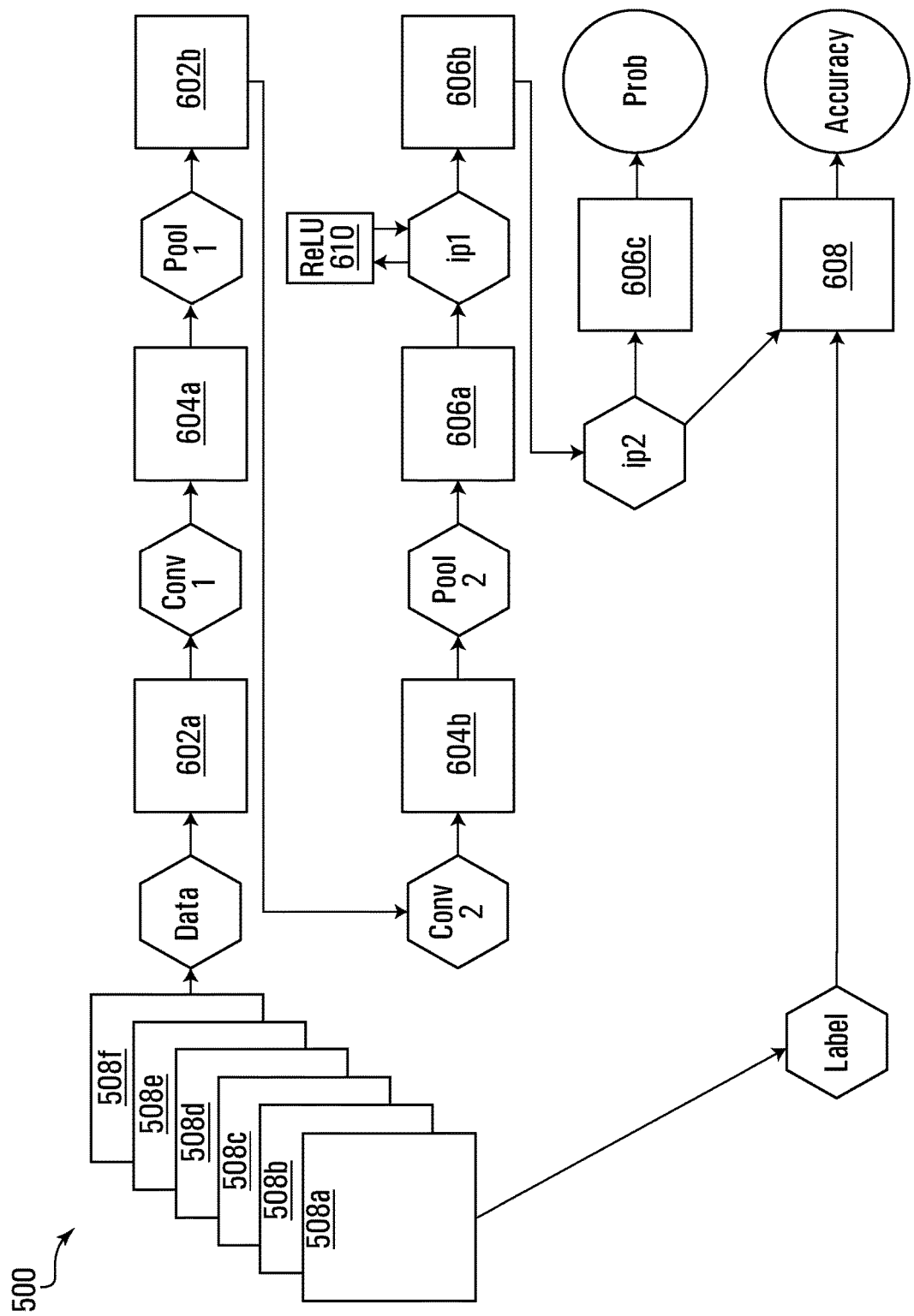
FIG. 6 depicts an example convolutional neural network used as the convolutional neural network of FIG. 5.

Once the CNN 500 has received the sample background and sample images 502a,b, the video analytics module 224 proceeds to block 404 and classifies the object-of-interest 504 using the CNN 500 and the sample background and sample images 502a,b. FIG. 6 shows the CNN 500 used in at least one example of the depicted example embodiment. The CNN 500 comprises first and second convolutional layers 602a,b, with the first convolutional layer 602a receiving the sample background and sample images 502a,b. The CNN 500 also comprises first and second pooling layers 604a,b, with the first pooling layer 604a receiving the output of the first convolutional layer 602a and providing the input of the second convolutional layer 602b, and the second pooling layer 604b receiving the output of the second convolutional layer 602b. The convolutional and pooling layers 602a,b and 604a,b collectively characterize the features of the sample background and sample images 502a,b. The layers 602a,b,604a,b,606c are connected in series and sequentially process the channels 508a-f.

The CNN 500 further comprises a multilayer perceptron network comprising first and second fully connected layers 606a,b and an output layer 606c, with the input to the fully connected layers 606a,b comprising the output of the second pooling layer 604b. The input to the first fully connected layer 606a comprises the output of the second pooling layer 604b. A module 610 that applies the ReLU function is applied to the output data, labeled ip1, of the first connected layer 606a, thereby raising to zero any non-positive outputs of the first connected layer 606a. The output of the first connected layer 606a, after the ReLU function has been applied to it, is sent to the second connected layer 606b. The output of the second connected layer 606b, labeled ip2, is sent to the output layer 606c, which applies the Softmax function to output the probabilities that the object-of-interest 504 is any one of a number of objects, such as a human, a vehicle, an animal, etc.

During training of the CNN 500, in parallel with the processing done by the convolutional layers 602a,b, pooling layers 604a,b, and multilayer perceptron network, the sample background and sample images 502a,b are labeled and sent to a training module 608, which outputs a binary signal indicating whether the output of the second connected layer 606b (ip2) represents an accurate classification of the object-of-interest 504. The module 608 does this by determining whether argmax(ip2) is identical to a user entered classification ("Label", in FIG. 6) for the object-of-interest 504. If argmax(ip2) and the Label are identical, the CNN 500 properly classified the object-of-interest 504; if not, the CNN 500 misclassified the object-of-interest 504. During training, the training module 608 also determines the loss function, which is used for back propagation and updating the CNN's 500 parameters.

In at least the depicted example embodiment, the first convolutional layer 602a receives the channels 508a-f when they are input to the CNN 500 and processes them. After the first convolutional layer's 602a processing is complete, it sends its output to the first pooling layer 604a. The first pooling layer 604a then processes the output of the first convolutional layer 602a, and once the first pooling layer's 604a processing is complete, sends its output to the second convolutional layer 604b. The second convolutional layer 604b then processes the output of the first pooling layer 604a. This pattern continues until the channels 508a-f have been processed sequentially by each of the layers 602a,b, 604a,b,606a-c in the CNN 500. Accordingly, in at least the depicted example embodiment, the first pooling layer 604a does not process one of the channels 508a-f while the first convolutional layer 602a is processing another of the channels 508a-f. In at least some embodiments, this permits the CNN 500 to implicitly compare the background and foreground of an image being processed. As used herein, a layer 602a,b,604a,b,606a-c is referred to as processing the channels 508a-f even if the input to that layer is not in the form of the six channels 508a-f input to the CNN 500. For example, as described below the second convolutional layer 602b has 32 kernels and accordingly outputs 32 channels to the second pooling layer 604b. Regardless, when the second pooling layer 604b processes those 32 channels from the second convolutional layer 602b, the second pooling layer 604b is said to be processing the channels 508a-f.

In at least one example embodiment, each of the channels 508a-f is a 26×26 pixel array, corresponding to a total input size to the CNN 500 of 26×26×6. The first convolutional layer 602a comprises 16 kernels, each 3×3, which are applied with a stride of 1. The second convolutional layer 602b comprises 32 kernels, each 3×3, which are applied with a stride of 1. Each of the pooling layers 604a,b is a 2×2 max pooling layer applied with a stride of 2. The first fully connected layer 606a is 800×32, and the second fully connected layer 606b is 32×2. The total number of coefficients for the CNN 500 is accordingly 31,136 (864+4,608+25,600+64) with a memory footprint of less than 10 MB. When the CNN 500 is executed using an Intel i7™ CPU running at 3.4 GHz, characterizing a single object-of-interest 504 requires 0.4 ms, which includes image pre-processing. A comparable conventional convolutional neural network, AlexNet (see Alex Krizhevsky, Ilya Sutskever, and Geoffrey E. Hinton, "Imagenet classification with deep convolutional neural networks" in *Advances in Neural Information Processing Systems*, pp. 1097-1105, 2012), uses approximately 60 million coefficients and has a memory footprint of 551 MB. The CNN 500 may accordingly be preferable to a neural network such as AlexNet when installation is to be performed on an embedded device with limited computing resources such as, for example, the video capture device 108.

In at least some example embodiments, the sample background and sample images 502a,b are image chips 702 derived from images captured by the video capture device 108, where a "chip" 702 is a region corresponding to portion of a frame of a captured video as depicted in FIG. 7. FIG. 7 also depicts an example frame 700 of captured video, with a chip 702 that is delineated by a bounding box 704, and the frame's 700 associated background model 704. The object-of-interest 504 in FIG. 6 is a person, and the background 506 comprises the portion of the background model 704 corresponding to the portion of the frame 700 that the chip 702 overlays. As discussed above, the video analytics module 224 may, through reference to multiple video frames 700, generate and maintain the background model 704, and that model 704 may comprise the sample background image 502b that is received by the CNN 500. In at least some example embodiments, the video analytics module 224 maintains the background model 704 for at least a portion of the frame 700 that corresponds to the chip 702 and one or more portions of the frame 700 in addition to the chip 702; in FIG. 7, for example, the module 224 maintains the background model 224 corresponding to the entire frame 700, and uses as the sample background image 502b that portion of the model 704 corresponding to the chip's 702 position in the frame 700. Consequently, as the object-of-interest 504, and consequently the chip 702, move from frame to frame 700, the video analytics module 224 may select as the sample background image 502b the portion of the background model 704 that corresponds to the position of the chip 702 for any given frame 700.

Reference will now be made to FIGS. 8A-8D, 9A-9B, 10A-10D, 11A-11J. FIGS. 8A-8D and 9A-9B depict graphs of the receiver operating characteristic (ROC, which is the true positive rate vs. false positive rate) for various CNNs trained according to conventional methods. Regarding FIGS. 10A-10D, 11A-11J, these depict graphs of the receiver operating characteristic of CNNs 500 trained according to certain example embodiments (as described in further detail below). A true positive is when the CNN correctly classifies the object-of-interest 504 as a human. The underlying architecture for the CNNs, whether trained according to conventional methods or trained in accordance with those example embodiments, comprises a LeNet architecture, such as that described in Y. LeCun, L. Bottou, Y. Bengio, and P. Haffner, "Gradient-based learning applied to document recognition", *Proceedings of the IEEE*, November 1998. Two types of CNN architectures are used: a first and a second architecture of which each comprises first and second convolutional layers, first and second pooling layers, first and second fully connected layers, and an output layer similar to the CNN 500 of FIG. 5, although trained differently as described below. In the first architecture CNN, each of the channels is represented as a 32×32 array, corresponding to a total input size to the CNN of 32×32×3 (when three channels are used for conventional training) 32×32×6 (when six channels are used, in accordance with at least certain example embodiments). The first convolutional layer comprises 20 kernels, each 5×5, which are applied with a stride of 1. The second convolutional layer comprises 50 kernels, each 5×5, which are applied with a stride of 1. Each of the pooling layers is a 2×2 max pooling layer applied with a stride of 2. The first fully connected layer is 1250×500, and the second fully connected layer is 500×2. The total number of coefficients for the first architecture CNN is accordingly 654,000 (3,000+25,000+625,000+1,000) for a six channel CNN, and 652,500 (1,500+25,000+625,000+1,000) for a three channel CNN. In the second architecture CNN, each of the channels is a 26×26 array, corresponding to a total input size to the CNN of 26×26×3 (when three channels are used for conventional training) and 26×26×6 (when six channels are used, in accordance with at least certain example embodiments). The first convolutional layer comprises 16 kernels, each 3×3, which are applied with a stride of 1. The second convolutional layer comprises 32 kernels, each 3×3, which are applied with a stride of 1. Each of the pooling layers is a 2×2 max pooling layer applied with a stride of 2. The first fully connected layer is 800×32, and the second fully connected layer is 32×2. The total number of coefficients for the second architecture CNN 400 is accordingly 31,136 (864+4,608+25,600+64) for a six channel CNN, and 30,704 (432+4,608+25,600+64) for a three channel CNN.

Figure 11A:
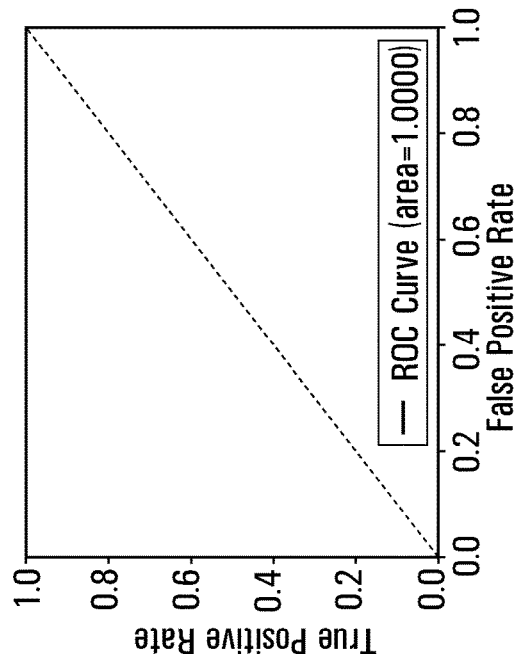
Figure 11B:
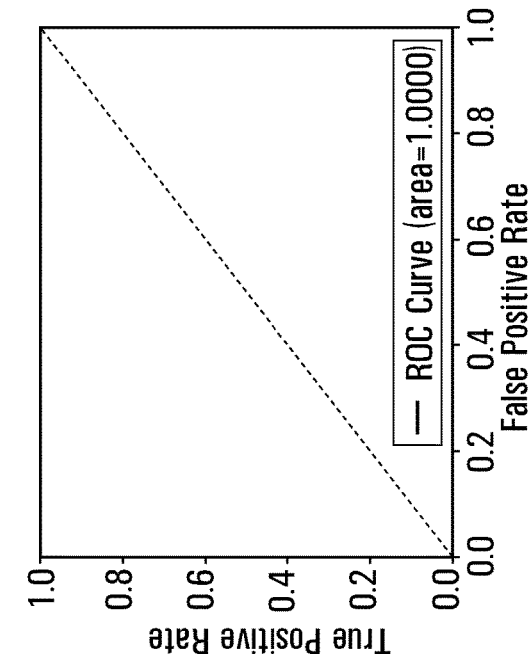
Figure 11C:
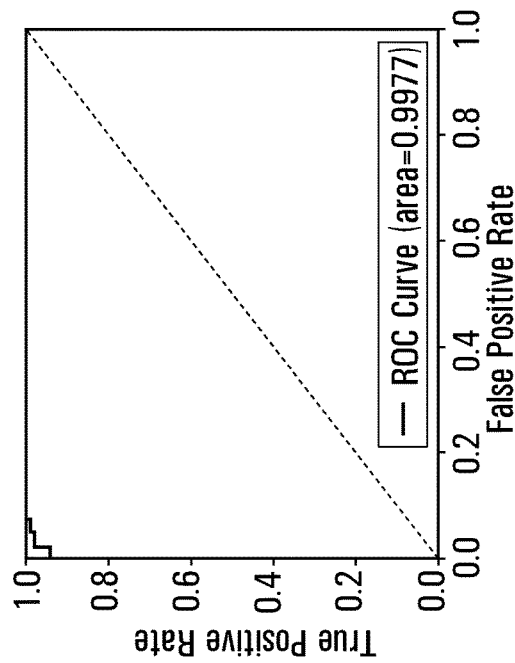
Figure 11D:
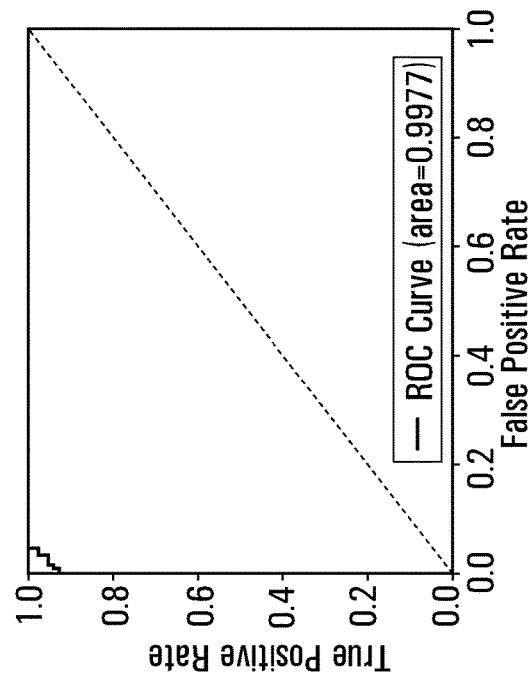
Figure 11E:
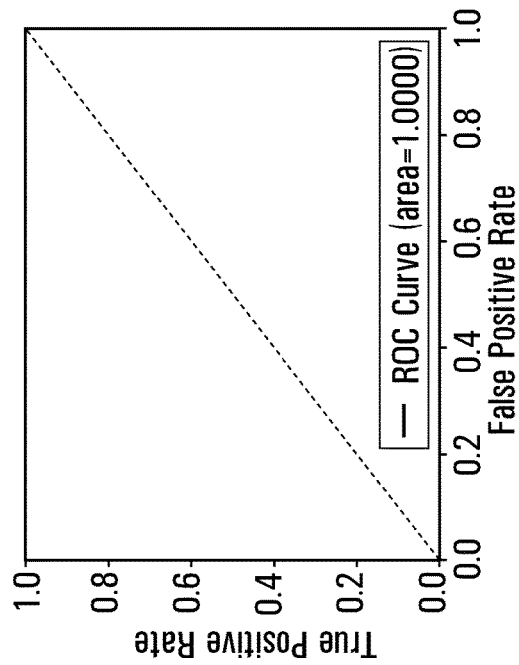
Figure 11F:
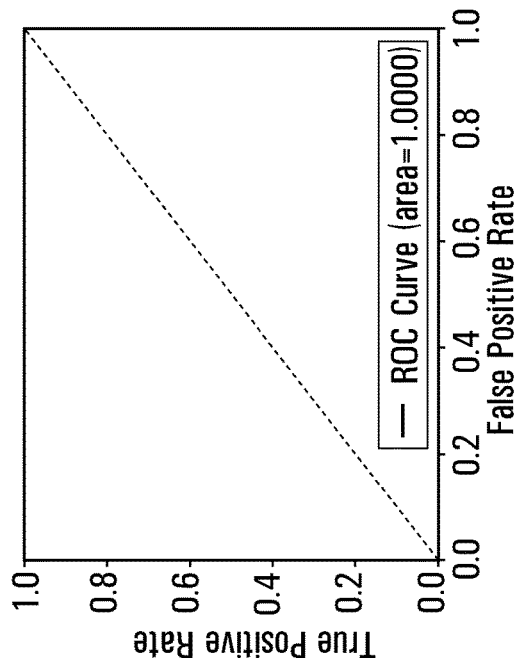
Figure 11G:
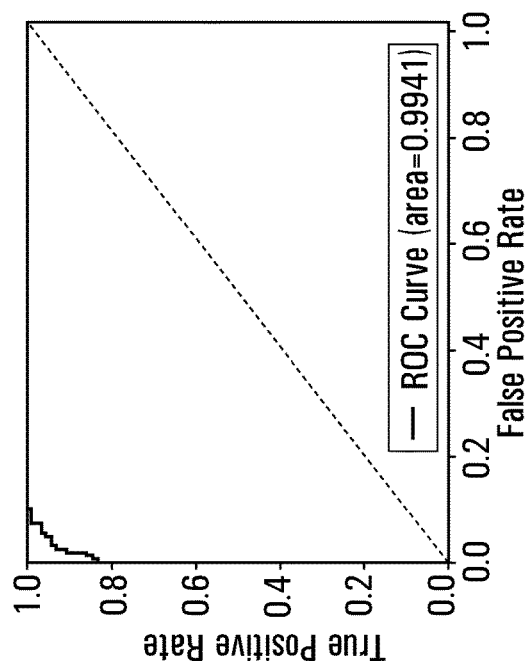
Figure 11H:
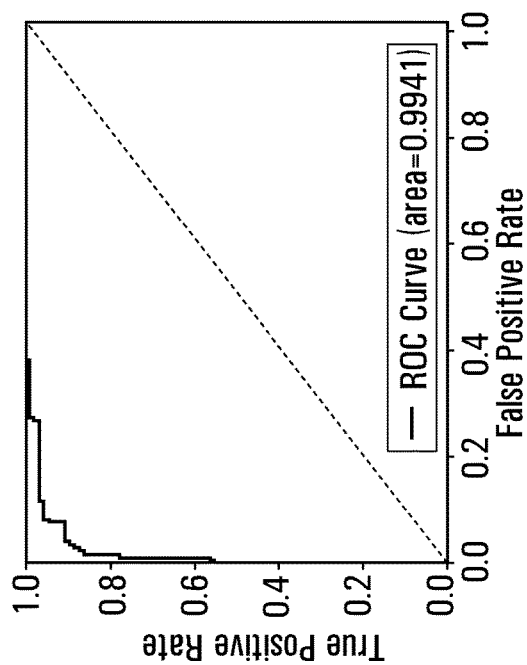
Figure 11J:
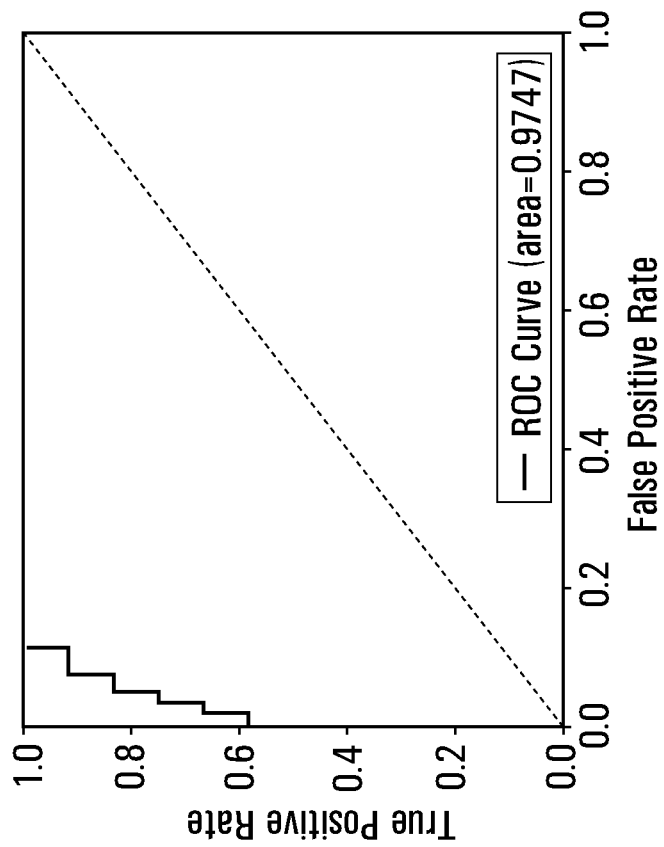
Figure 11I:
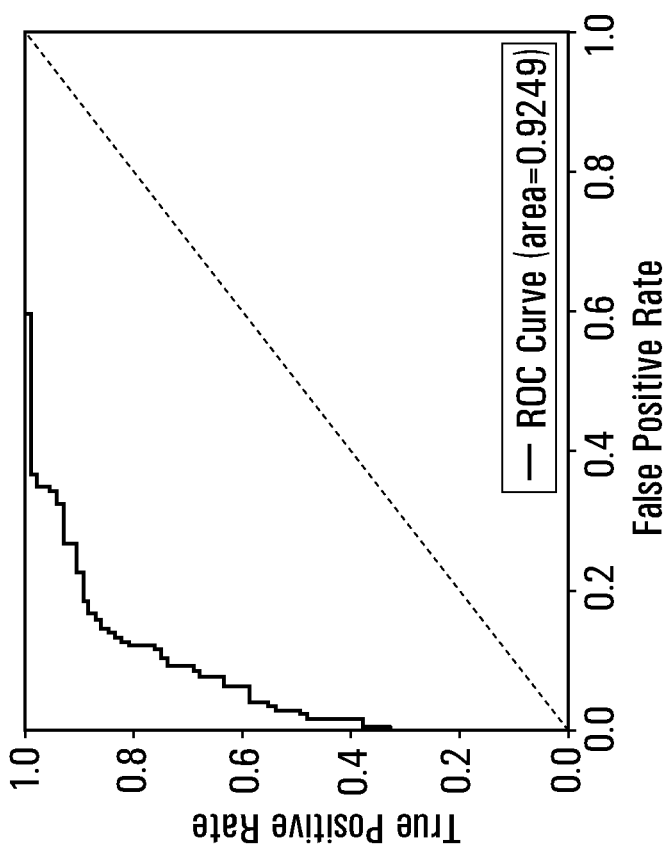
Figure 12:
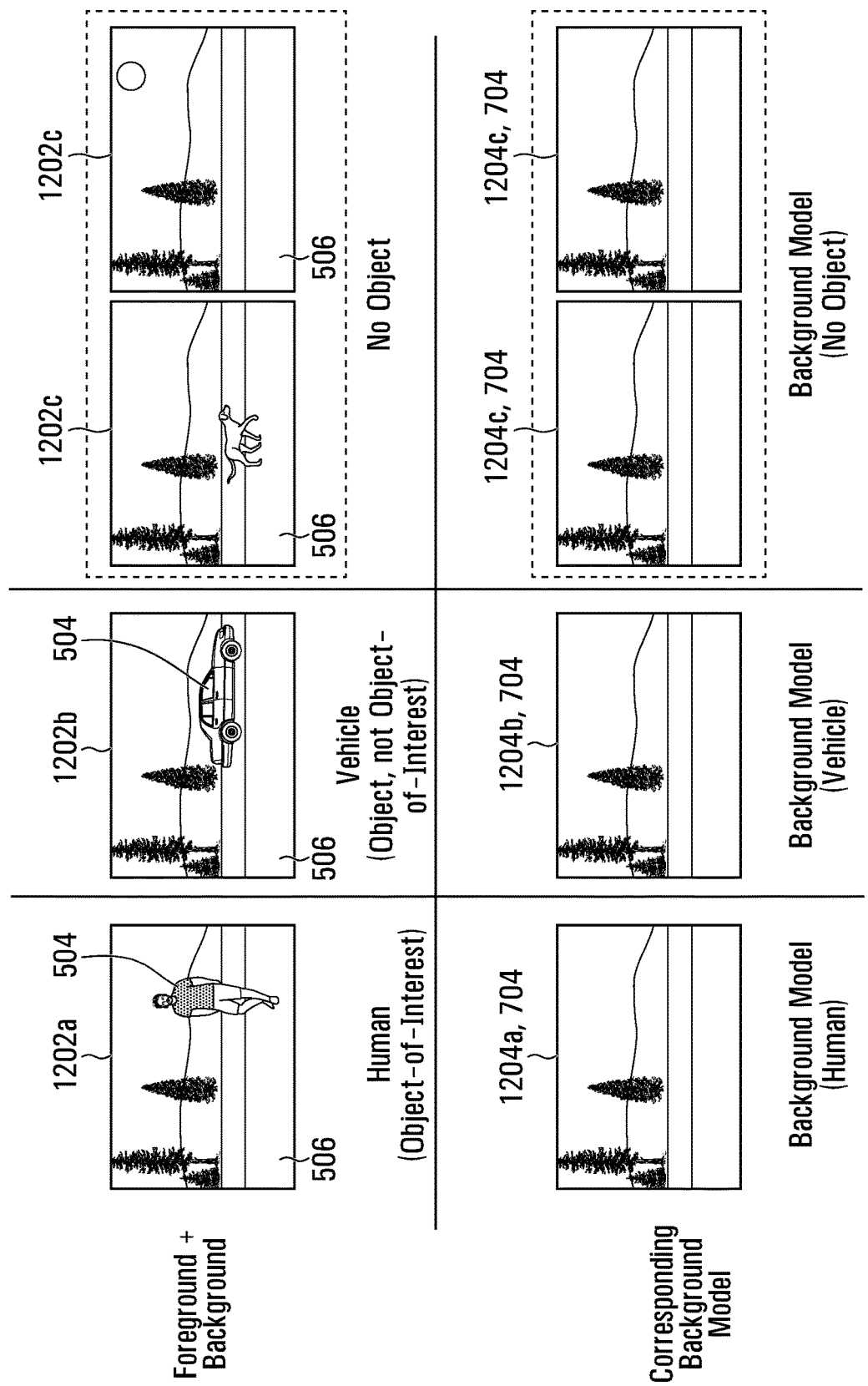
FIG. 12 depicts types of images used for training and testing the convolutional neural networks used to generate the receiver operating characteristic graphs shown in earlier figures.

In generating 8A-8D, 9A-9B, 10A-10D, 11A-11J, first and second datasets are used for training and testing, with each of the datasets comprising the types of training images 1202*a-c*,1204*a-c* depicted in FIG. 12. The images 1202*a-c*, 1204*a-c* of FIG. 12 are selected to facilitate training and testing of conventionally trained CNNs and CNNs 500 trained according to certain example embodiments. FIG. 12 shows six types of training images 1202*a-c*,1204*a-c*, with three types of images 1202*a-c* deemed to comprise foreground and background, and three types of images 1204*a-c* deemed to comprise the corresponding background model 704 without any foreground. The CNNs (whether conventionally trained or trained according to certain example embodiments) are trained to classify two types of objects-of-interest 504: a human and a vehicle. The CNNs are not trained to recognize any other objects, such as animals, as an object-of-interest 504. As mentioned above and as indicated in FIG. 12, a true "positive" result for FIGS. 8A-8D, 9A-9B, 10A-10D, 11A-11J is when a CNN correctly classifies a human as a human. Analogously, a false "positive" is when a CNN classifies anything but a human as a human.

The three types of images in FIG. 12 that comprise foreground and background are "human" images 1202*a*, which show a human overlaid on a background 506; "vehicle" images 1202*b*, which show a vehicle overlaid on a background 506; and "no object" images 1202*c*, which show something other than a human or vehicle overlaid on a background 506. As shown in FIG. 12, a "no object" image 1202*c* may have a foreground comprising an object that the CNN is not trained to classify, such as an animal.

The three types of images 1204*a-c* in FIG. 12 that comprise the background model 704 are background model (human) images 1204*a*, which comprise a background model 704 corresponding to the background for one of the human images; background model (vehicle) images 1204*b*, which comprise a background model 704 corresponding to the background for one of the vehicle images; and background model (no object) images 1204*c*, which comprise a background model 704 corresponding to the background for one of the no object images. As discussed in respect of FIG. 7 above, the background images 1204*a-c* of FIG. 12 do not necessarily exactly match the backgrounds 506 of the human, vehicle, and no object images 1202*a-c* because the background models 704 used to generate the background images 1204*a-c* may be generated as an average of pixels selected from multiple video frames 700. For example, as shown in the rightmost no object and background model (no object) image pair of FIG. 12, the illumination of the background 506 in the no object image 1202*c* and of the corresponding background model 704 in the background model (no object) image 1204*c* differ.

The first dataset comprises 45,838 of the human images 1202*a*, 821,258 of the no object images 1202*b*, and 42,323 of the vehicle images 1202*c*. The second dataset, which comprises version 2.0 of the VIRAT dataset as described in "A Large-scale Benchmark Dataset for Event Recognition in Surveillance Video" by Sangmin Oh, Anthony Hoogs, Amitha Perera, Naresh Cuntoor, Chia-Chih Chen, Jong Taek Lee, Saurajit Mukherjee, J. K. Aggarwal, Hyungtae Lee, Larry Davis, Eran Swears, Xiaoyang Wang, Qiang Ji, Kishore Reddy, Mubarak Shah, Carl Vondrick, Hamed Pirsiavash, Deva Ramanan, Jenny Yuen, Antonio Torralba, Bi Song, Anesco Fong, Amit Roy-Chowdhury, and Mita Desai, in *Proceedings of IEEE Computer Vision and Pattern Recognition* (CVPR), comprises 180,487 of the human images 1202*a*, 170,048 of the no object images 1202*b*, and 136,802 of the vehicle images 1202*c*.

Figure 8A:
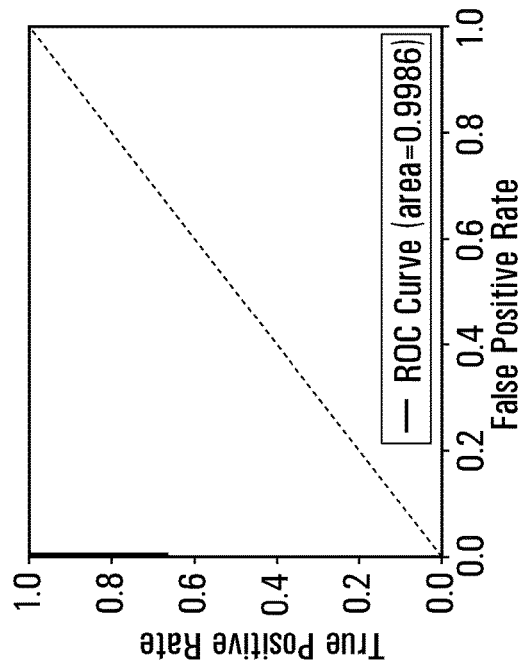
Figure 8B:
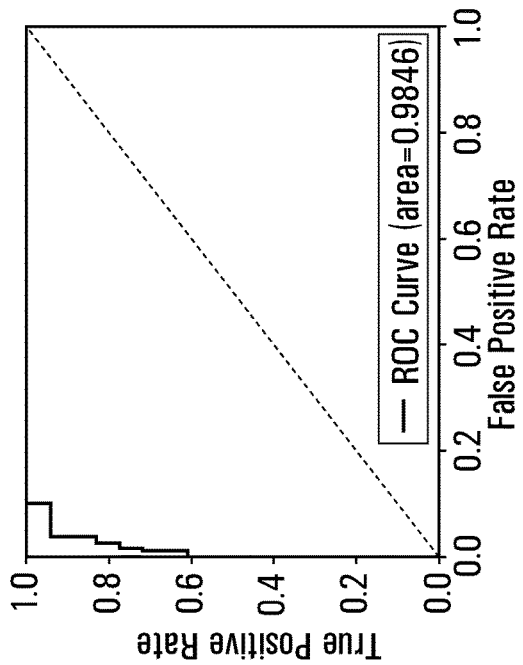
Figure 8C:
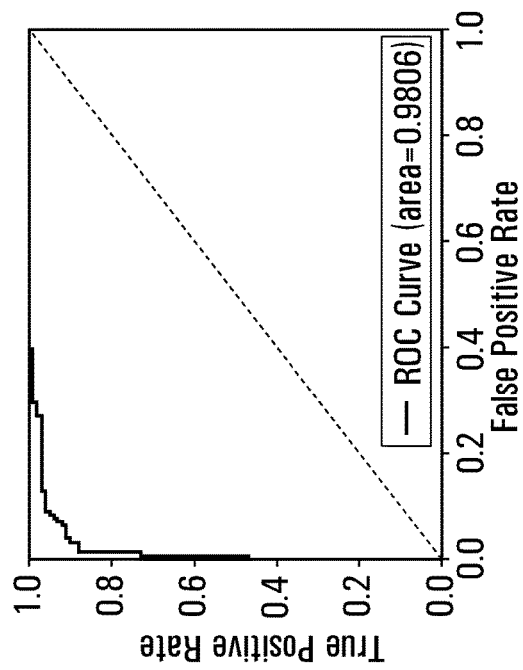
Figure 8D:
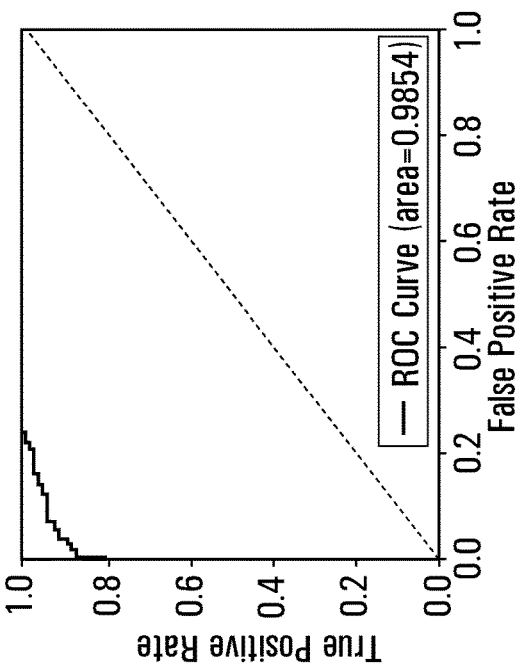

Referring now to FIGS. 8A-8D, there are shown graphs of the ROC when the first architecture CNN is trained (FIGS. 8A and 8B) and when the second architecture CNN is trained (FIGS. 8C and 8D) conventionally. In FIGS. 8A and 8C, each of the first and second architecture CNNs is trained using images from the first dataset (46,000 human images 1202*a*, 40,000 no object images 1202*c*, and 20,000 vehicle images 1202*b*), and testing is done using the entire second dataset, with the no object and vehicle images 1202*c*,*b* both being treated as negative results during training. In FIGS. 8B and 8D, each of the first and second architecture CNNs is trained using the entire second dataset, and testing is done using the entire first dataset, with the no object and vehicle images 1202*c*,*b* again both being treated as negative results during training.

The area under the ROC curve of FIG. 8A is 0.9806, while the area under the ROC curve of FIG. 8B is 0.9986, with the better performance in FIG. 8B resulting from the larger training dataset. The area under the ROC curve of FIG. 8C is 0.9854, while the area under the ROC curve of FIG. 8D is 0.9846. While these areas are comparable, FIG. 8D shows the second architecture CNN having a lower false positive rate.

Referring now to FIGS. 9A and 9B, there are shown graphs of the ROC when the first architecture is trained. In FIG. 9A, the first architecture CNN is trained using the same images as for FIG. 8A, with the addition of 20,000 background model (human) images 1204*a*. As with FIG. 8A, the no object and vehicle images 1202*c*,*b* are treated as negative results during training. The first architecture CNN is then tested in the same manner as it is for FIG. 8A. In FIG. 9B, the first architecture CNN is trained using the second dataset, including 50,000 background model (human) images 1204*a*. As with FIG. 8B, the no object and vehicle images 1202*c*,*b* are treated as negative results during training. The first architecture CNN is then tested in the same manner as the first architecture CNN is for FIG. 8B. The areas under the ROC curves of FIGS. 9A and 9B are similar to the areas under the ROC curves of FIGS. 8A and 8B, respectively. Increasing the training data set by 20,000 (for FIG. 9A compared to FIG. 8A) and 50,000 (for FIG. 9B compared to FIG. 8B) accordingly does not result in significantly different test results.

Figure 10A:
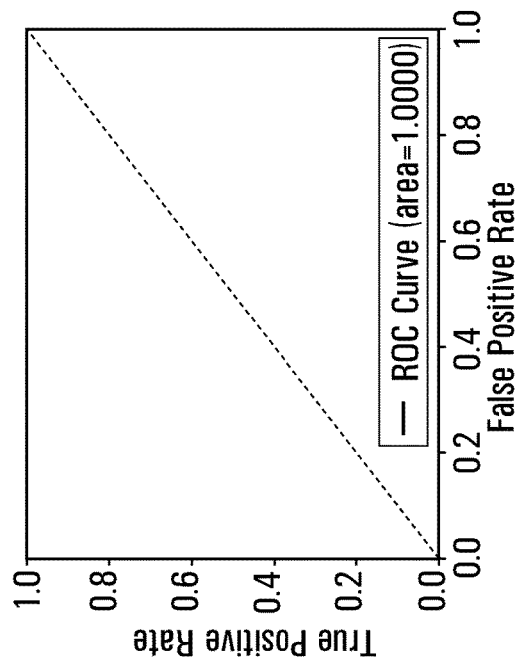
FIGS. 10A-10D and 11A-11J depict graphs of the receiver operating characteristic for convolutional neural networks trained and used in accordance with certain example embodiments.
Figure 10B:
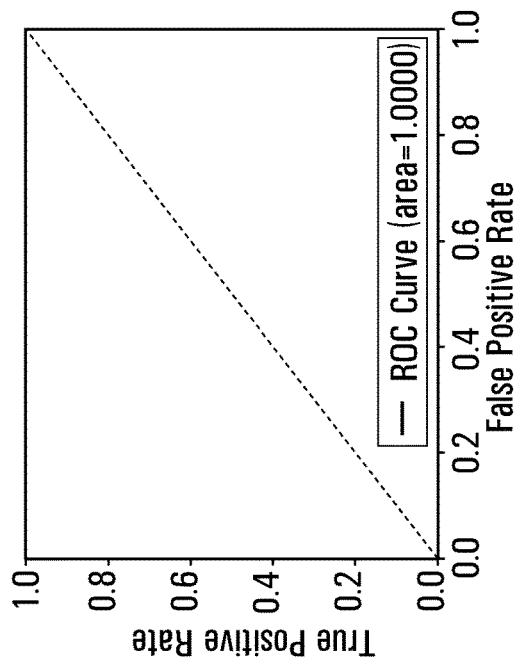
Figure 10C:
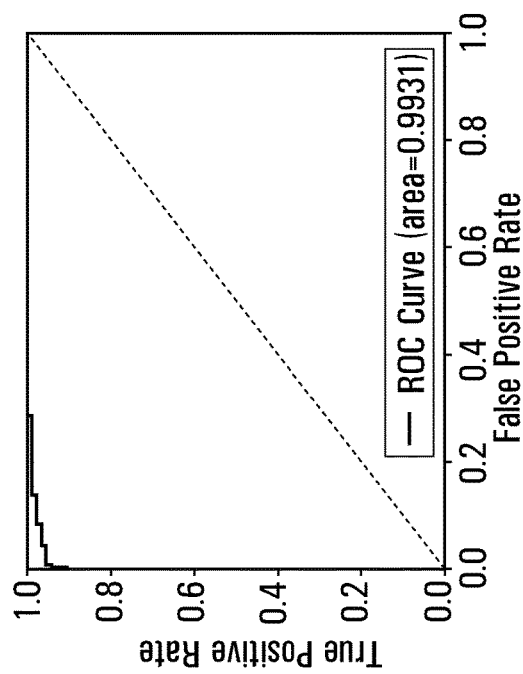
Figure 10D:
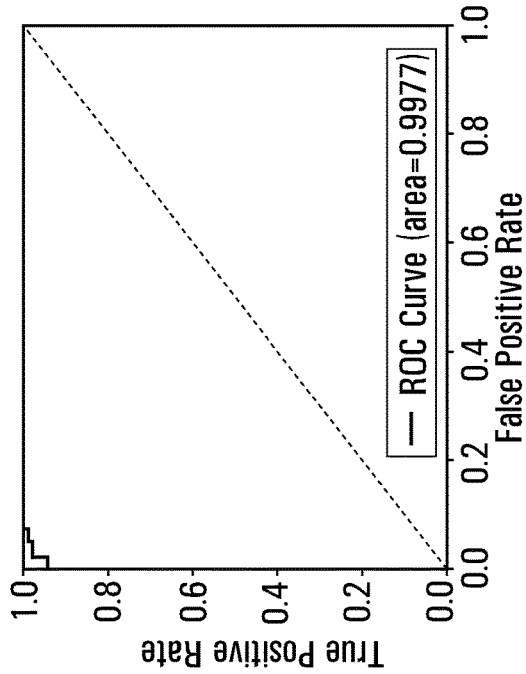

Referring now to FIGS. 10A-10D, there are shown graphs of the ROC when the first architecture CNN is trained (FIGS. 10A and 10B) and when the second architecture CNN is trained (FIGS. 10C and 10D). In FIGS. 10A and 10C, each of the first and second architecture CNNs is trained using pairs of images from the first dataset. The training data comprises 43,000 human training image pairs, with each of the human training image pairs comprising one of the human images 1202a of the first dataset and one of the background model (human) images of the first dataset 1204a; 40,000 no object training image pairs, with each of the no object training image pairs comprising one of the no object images 1202c of the first dataset and one of the background model (no object) images 1204c of the first dataset; and 20,000 vehicle training image pairs, with each of the vehicle training image pairs comprising one of the vehicle images 1202b of the first dataset and a background model (vehicle) image 1204b. During training, six channels 508a-f of data are sent to the first architecture CNN: the first three channels 508a-c are the red, green, and blue channels for one of the training images, and the last three channels 508d-f are the ref, green, and blue channels for another of the training images; in at least the depicted example embodiment, the order in which the channels 508a-f are presented to the CNN during training matches the order in which the channels 508a-f are presented to the CNN during testing. All image pairs from the second dataset are used for testing the first architecture CNN.

In FIGS. 10B and 10D, each of the first and second architecture CNNs is trained using pairs of images from the second dataset. The training data comprises 168,000 human training image pairs, with each of the human training image pairs comprising one of the human images 1202a of the second dataset and one of the background model (human) images 1204a of the second dataset; 170,000 no object training image pairs, with each of the no object training image pairs comprising one of the no object images 1202c of the second dataset and one of the background model (no object) images 1204c; and 129,000 vehicle training image pairs, with each of the vehicle training image pairs comprising one of the vehicle images 1202b of the second dataset and one of the background model (vehicle) images 1204b of the second dataset. As with the first architecture CNN, six channels 508a-f of data are sent to the second architecture CNN during training: the first three channels 508a-c are the red, green, and blue channels for one of the training images, and the last three channels 508d-f are the ref, green, and blue channels for another of the training images. All image pairs from the first dataset are used for testing the second architecture CNN.

The area under the ROC curves of FIGS. 10A-10D are 0.9931, 1.0000, 0.9977, and 1.0000, respectively, which are superior to the areas under the analogous ROC curves of FIGS. 8A-8D. Although more training data is used when generating FIGS. 10A-10D, the results shown in FIGS. 9A and 9B establish that more data, alone, does not generate superior results. Rather, the superior results of FIGS. 10A-10D may be attributed to training using pairs of images 502a,b, with one of the images 502a comprising the object-of-interest 504 overlaid on the background 506 and the other of the images 502b comprising the background 506 without the object-of-interest 504.

During training, optimization methods (such as stochastic gradient descent), and numerical gradient computation methods (such as backpropagation) are used to find the set of parameters that minimize our objective function (also known as a loss function). A cross entropy function is used as the objective function in the depicted example embodiments. This function is defined such that it takes high values when it the current trained model is less accurate (i.e., incorrectly classifies objects-of-interest), and low values when the current trained model is more accurate (i.e., correctly classifies objects-of-interest). The training process is thus reduced to a minimization problem. The process of finding the most accurate model is the training process, the resulting model with the set of parameters is the trained model, and the set of parameters is not changed once it is deployed.

Referring now to FIGS. 11A-11J, there are shown test results of the second architecture CNN, trained as for FIG. 10C (FIGS. 11A, 11C, 11E, 11G, and 11I) and as for FIG. 10D (FIGS. 11B, 11D, 11F, 11H, and 11J), applied to images 1202a-c,1204a-c comprising chips that are cropped. For each of FIGS. 11A-11J, the chips are first squared and padded by 12.5% per side. FIGS. 11A and 11B show the ROC curves for a 20% center crop; FIGS. 11C and 11D show the ROC curves for a 20% random crop; FIGS. 11E and 11F show the ROC curves for a 30% random crop; FIGS. 11G and 11H show the ROC curves for a 40% random crop; and FIGS. 11I and 11J show the ROC curves for a 50% random crop. The results shown in FIGS. 11G and 11H, corresponding to the 40% random crop, are comparable to those of FIGS. 9A and 9B, in which image pairs are not used for training.

While the above description provides examples of the embodiments with human objects as the primary objects of interest, it will be appreciated that the underlying methodology of extracting chips from objects, computing a feature vector representation from them and furthermore, using this feature vector as a basis to compare against feature vectors from other objects, is agnostic of the class of the object under consideration. A specimen object could include a bag, a backpack or a suitcase. An object classification system to locates vehicles, animals, and inanimate objects may accordingly be implemented using the features and/or functions as described herein without departing from the spirit and principles of operation of the described embodiments.

Additionally, while the foregoing depicted embodiments are directed at an artificial neural network that comprises a convolutional neural network, in at least some different embodiments (not depicted), classification may be performed using one or more different types of artificial neural network. For example, the method 400 may be applied using any one or more of AlexNet, GoogleNet, and ResNet. The method 400 may additionally or alternatively be applied using a CNN detector that, in addition to object classification as described above, finds the location of the object-of-interest 404 in an image. Examples of CNN detectors include a "single-shot detector" and a "you only look once" detector, as described in Liu, Wei, Dragomir Anguelov, Dumitru Erhan, Christian Szegedy, Scott Reed, Cheng-Yang Fu, and Alexander C. Berg, "SSD: Single Shot MultiBox Detector" in *European Conference on Computer Vision*, pp. 21-37, and Springer, Cham, 2016 and Redmon, Joseph, Santosh Divvala, Ross Girshick, and Ali Farhadi, "You Only Look Once: Unified, Real-time Object Detection" in *Proceedings of the IEEE Conference on Computer Vision and Pattern Recognition*, pp. 779-788. 2016, respectively.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A method comprising:
   receiving at an artificial neural network:
      a sample image comprising an object-of-interest overlaying a background; and
      a sample background image excluding the object-of-interest and corresponding to the background overlaid by the object-of-interest; and
   classifying the object-of-interest using the artificial neural network, wherein the artificial neural network classifies the object-of-interest using the sample background and sample images, and
   wherein prior to receiving the sample background and sample images the artificial neural network has been trained to classify the object-of-interest using training image pairs, each of at least some of the training image pairs comprising a first training image comprising a training object-of-interest overlaying a training background and a training background image excluding the training object-of-interest and corresponding to the training background.

2. The method of claim 1, wherein the sample background and sample images are received having an identical number and type of channels as each other.

3. The method of claim 1, wherein the sample background and sample images collectively comprise a number of channels, the artificial neural network comprises a convolutional neural network that comprises multiple layers connected in series that sequentially process the channels.

4. The method of claim 3, wherein the layers comprise at least one convolutional layer that receives the sample background and sample images and at least one pooling layer that receives an output of the at least one convolutional layer.

5. The method of claim 4, wherein the convolutional neural network further comprises a multilayer perceptron network that receives an output of the at least one pooling layer and that outputs a classification of the object-of-interest of the sample image.

6. The method of claim 1, further comprising:
   receiving a video comprising multiple frames, wherein each of the frames comprises background pixels;
   identifying at least some of the background pixels;
   generating a background model by averaging the background pixels that are identified from the multiple frames; and
   using as the sample background image at least a portion of the background model.

7. The method of claim 6, wherein identifying at least some of the background pixels comprises, for each of at least some unclassified pixels in the frames:
   comparing a magnitude of a motion vector for the unclassified pixel to a background threshold; and
   when the magnitude of the motion vector is less than a background threshold, classifying the unclassified pixel as a background pixel.

8. The method of claim 1, wherein the training object-of-interest is an identical type of object as the object-of-interest of the sample image, each of at least some others of the training image pairs comprise a first training image comprising a training object overlaying a training background and a training background image excluding the training object and corresponding to the training background, and the training object-of-interest and training object are different types of objects.

9. The method of claim 1, wherein each of at least some others of the training image pairs comprise a first training background image depicting a training background without any object and a second training background image depicting the training background of the first training background image without any object and illuminated differently than in the first training background image.

10. The method of claim 1, wherein the training background differs from the background that the object-of-interest of the sample image overlays.

11. The method of claim 1, wherein the artificial neural network is implemented on a camera comprising part of a video surveillance system.

12. The method of claim 11, wherein the sample background and sample images are image chips derived from images captured by the camera.

13. The method of claim 11, wherein the training background image and the sample background image depict identical locations.

14. A video capture device, comprising:
   an image sensor;
   a processor communicatively coupled to the image sensor; and
   a memory device communicatively coupled to the processor, wherein the memory device has stored thereon computer program code that is executable by the processor and that, when executed by the processor, causes the processor to perform a method comprising:
      receiving at an artificial neural network:
         a sample image comprising an object-of-interest overlaying a background; and
         a sample background image excluding the object-of-interest and corresponding to the background overlaid by the object-of-interest; and
      classifying the object-of-interest using the artificial neural network, wherein the artificial neural network classifies the object-of-interest using the sample background and sample images, and
      wherein prior to receiving the sample background and sample images the artificial neural network has been trained to classify the object-of-interest using training image pairs, each of at least some of the training image pairs comprising a first training image comprising a training object-of-interest overlaying a training background and a training background image excluding the training object-of-interest and corresponding to the training background.

15. The device of claim 14, wherein the sample background and sample images are received having an identical number and type of channels as each other.

16. The device of claim 14, wherein the sample background and sample images collectively comprise a number of channels, the artificial neural network comprises a convolutional neural network that comprises multiple layers connected in series that sequentially process the channels.

17. The device of claim 16, wherein the layers comprise at least one convolutional layer that receives the sample background and sample images and at least one pooling layer that receives an output of the at least one convolutional layer.

18. The device of claim 17, wherein the convolutional neural network further comprises a multilayer perceptron network that receives an output of the at least one pooling layer and that outputs a classification of the object-of-interest of the sample image.

19. The device of claim 14, wherein the method further comprises:
    receiving a video comprising multiple frames, wherein each of the frames comprises background pixels;
    identifying at least some of the background pixels;
    generating a background model by averaging the background pixels that are identified from the multiple frames; and
    using as the sample background image at least a portion of the background model.

20. The device of claim 19, wherein identifying at least some of the background pixels comprises, for each of at least some unclassified pixels in the frames:
    comparing a magnitude of a motion vector for the unclassified pixel to a background threshold; and
    when the magnitude of the motion vector is less than a background threshold, classifying the unclassified pixel as a background pixel.

21. The device of claim 14, wherein the training object-of-interest is an identical type of object as the object-of-interest of the sample image, each of at least some others of the training image pairs comprise a first training image comprising a training object overlaying a training background and a training background image excluding the training object and corresponding to the training background, and the training object-of-interest and training object are different types of objects.

22. The device of claim 14, wherein each of at least some others of the training image pairs comprise a first training background image depicting a training background without any object and a second training background image depicting the training background of the first training background image without any object and illuminated differently than in the first training background image.

23. The device of claim 14, wherein the training background differs from the background that the object-of-interest of the sample image overlays.

24. The device of claim 14, wherein the sample background and sample images are image chips derived from images captured by the image sensor.

25. The device of claim 14, wherein the training background image and the sample background image depict identical locations.

26. A non-transitory computer readable medium having stored thereon computer program code that is executable by a processor and that, when executed by the processor, causes the processor to perform a method comprising:
    receiving at an artificial neural network:
        a sample image comprising an object-of-interest overlaying a background; and
        a sample background image excluding the object-of-interest and corresponding to the background overlaid by the object-of-interest; and
    classifying the object-of-interest using the artificial neural network, wherein the artificial neural network classifies the object-of-interest using the sample background and sample images, and
    wherein prior to receiving the sample background and sample images the artificial neural network has been trained to classify the object-of-interest using training image pairs, each of at least some of the training image pairs comprising a first training image comprising a training object-of-interest overlaying a training background and a training background image excluding the training object-of-interest and corresponding to the training background.

27. A method comprising:
    providing training image pairs to an artificial neural network, wherein more than one of the training image pairs each comprise:
        a first training image comprising a training object-of-interest overlaying a training background; and
        a training background image excluding the training object-of-interest and corresponding to the training background; and
    training, by using the pairs of training images, the artificial neural network to classify an object-of-interest overlaying a background in a sample image using the sample image and a sample background image excluding the object-of-interest of the sample image and corresponding to the background of the sample image.

28. The method of claim 27, wherein the training object-of-interest is an identical type of object as the object-of-interest of the sample image, each of at least some others of the training image pairs comprise a first training image comprising a training object overlaying a training background and a training background image excluding the training object and corresponding to the training background, and the training object-of-interest and training object are different types of objects.

29. The method of claim 27, wherein each of at least some others of the training image pairs comprise a first training background image depicting a training background without any object and a second training background image depicting the training background of the first training background image without any object and illuminated differently than in the first training background image.

30. The method of claim 27, wherein the training background differs from the background that the object-of-interest of the sample image overlays.

31. The method of claim 27, wherein the artificial neural network is implemented on a camera comprising part of a video surveillance system, and the training background image and the sample background image depict identical locations.

32. A system comprising:
    a storage device that stores pairs of training images;
    a processor communicatively coupled to the storage device and to an artificial neural network; and
    a memory device communicatively coupled to the processor, wherein the memory device has stored thereon computer program code that is executable by the processor and that, when executed by the processor, causes the processor to perform a method comprising:
        providing training image pairs to an artificial neural network, wherein more than one of the training image pairs each comprise:
            a first training image comprising a training object-of-interest overlaying a training background; and
            a training background image excluding the training object-of-interest and corresponding to the training background; and
        training, by using the pairs of training images, the artificial neural network to classify an object-of-interest overlaying a background in a sample image using the sample image and a sample background image excluding the object-of-interest of the sample image and corresponding to the background of the sample image.

33. The system of claim 32, wherein the training object-of-interest is an identical type of object as the object-of-interest of the sample image, each of at least some others of the training image pairs comprise a first training image comprising a training object overlaying a training background and a training background image excluding the training object and corresponding to the training background, and the training object-of-interest and training object are different types of objects.

34. The system of claim 32, wherein each of at least some others of the training image pairs comprise a first training background image depicting a training background without any object and a second training background image depicting the training background of the first training background image without any object and illuminated differently than in the first training background image.

35. The system of claim 32, wherein the training background differs from the background that the object-of-interest of the sample image overlays.

36. The system of claim 32, wherein the artificial neural network is implemented on a camera comprising part of a video surveillance system, and the training background image and the sample background image depict identical locations.

37. A non-transitory computer readable medium having stored thereon computer program code that is executable by a processor and that, when executed by the processor, causes the processor to perform a method comprising:
receiving at an artificial neural network:
a sample image comprising an object-of-interest overlaying a background; and
a sample background image excluding the object-of-interest and corresponding to the background overlaid by the object-of-interest; and
classifying the object-of-interest using the artificial neural network, wherein the artificial neural network classifies the object-of-interest using the sample background and sample images, and
wherein prior to receiving the sample background and sample images the artificial neural network has been trained to classify the object-of-interest using training image pairs, each of at least some of the training image pairs comprising a first training image comprising a training object-of-interest overlaying a training background and a training background image excluding the training object-of-interest and corresponding to the training background.

* * * * *